United States Patent
Ibrahim et al.

(10) Patent No.: US 11,563,613 B2
(45) Date of Patent: Jan. 24, 2023

(54) METHOD AND SYSTEM FOR COMMUNICATING DATA OVER RESIDENTIAL POWER LINES

(71) Applicants: Mai Mahmoud Hassan Salem Ibrahim, Waterloo (CA); Syed Hassan Raza Naqvi, Waterloo (CA); Pin-Han Ho, Waterloo (CA)

(72) Inventors: Mai Mahmoud Hassan Salem Ibrahim, Waterloo (CA); Syed Hassan Raza Naqvi, Waterloo (CA); Pin-Han Ho, Waterloo (CA)

( * ) Notice: Subject to any disclaimer, the term of this patent is extended or adjusted under 35 U.S.C. 154(b) by 0 days.

(21) Appl. No.: 17/382,268

(22) Filed: Jul. 21, 2021

(65) Prior Publication Data

US 2022/0038321 A1    Feb. 3, 2022

Related U.S. Application Data

(60) Provisional application No. 63/055,107, filed on Jul. 22, 2020.

(51) Int. Cl.
*H04L 27/26* (2006.01)
*H04L 1/08* (2006.01)
*H04L 12/66* (2006.01)
*H04B 3/54* (2006.01)

(52) U.S. Cl.
CPC .......... *H04L 27/2614* (2013.01); *H04B 3/54* (2013.01); *H04L 1/08* (2013.01); *H04L 12/66* (2013.01)

(58) Field of Classification Search
CPC ....... H04L 27/2614; H04L 1/08; H04L 12/66; H04L 1/20; H04L 5/0062; H04B 3/54
See application file for complete search history.

(56) References Cited

U.S. PATENT DOCUMENTS

| | | | |
|---|---|---|---|
| 4,749,992 A * | 6/1988 | Fitzemeyer | G01D 4/004 340/3.54 |
| 8,958,500 B2 * | 2/2015 | Huang | H03G 7/007 375/297 |
| 10,863,386 B1 * | 12/2020 | Anand | H04J 3/0647 |
| 11,082,011 B1 * | 8/2021 | Bonen | H04B 10/25891 |
| 2009/0092195 A1 * | 4/2009 | Guo | H04L 27/2623 375/260 |

(Continued)

OTHER PUBLICATIONS

"Common Public Radio Interface; eCPRI Interface Specification," eCPRI Specification V2 (May 10, 2019), May 2019.

(Continued)

*Primary Examiner* — Khanh C Tran
(74) *Attorney, Agent, or Firm* — Shin Hung; VanTek IP LLP

(57) ABSTRACT

Using residential power lines communication (PLC) as the last hop of the CPRI-based front-haul to the indoor users, where unmodified time division multiplexed (TDM) CPRI hyper-frames are transported in between the outdoor distributed unit (DU) and the indoor radio unit (RU) transparently. To countermeasure the hostile environment of power lines, proposed is a novel device, called CPRI-PLC-Gateway (CPG), which serves as an agent for creating a virtual CPRI link between the DU and RU. The proposed CPG aims to meet the desired CPRI options in the presence of the noisy PLC channel while remaining completely transparent to the CPRI protocol operation.

18 Claims, 9 Drawing Sheets

(56) References Cited

U.S. PATENT DOCUMENTS

| | | | | |
|---|---|---|---|---|
| 2016/0277964 | A1* | 9/2016 | Xu | H04W 88/085 |
| 2018/0091348 | A1* | 3/2018 | Agon | H04L 27/2647 |
| 2018/0278452 | A1* | 9/2018 | Yang | H04L 27/2614 |
| 2019/0190628 | A1* | 6/2019 | Wu | H04L 27/2614 |
| 2021/0112146 | A1* | 4/2021 | Sevindik | H04L 67/34 |

OTHER PUBLICATIONS

"Common Public Radio Interface (CPRI); Interface Specification," CPRI Specification V7.0 (Oct. 9, 2015), Oct. 2015.

L. Di Bert, P. Caldera, D. Schwingshackl, and A. M. Tonello, "On noise modeling for power line communications," in 2011 IEEE International Symposium on Power Line Communications and its Applications, 2011, pp. 283-288.

C. A. Duarte, "Self and Mutual Transmission Line Impedance Estimation by Means of the Non-Linear Least Squares Method," in Simposio Internacional sobre la Calidad de la Energía Eléctrica SICEL, vol. 7, 2013.

R. Hashmat, P. Pagani, A. Zeddam, and T. Chonave, "A Channel Model for Multiple Input Multiple Output in-home Power Line Networks," in 2011 IEEE International Symposium on Power Line Communications and its Applications, 2011, pp. 35-41.

R. Hashmat, P. Pagani, A. Zeddam, and T. Chonavel, "MIMO com-munications for in home PLC networks: Measurements and results up to 100 MHz," in 2010 International Symposium on Power Line Communications and its Applications, 2010, pp. 120-124.

Jeong Geun Kim and M. M. Krunz, "Delay analysis of selective repeat ARQ for a Markovian source over a wireless channel," IEEE Transactions on Vehicular Technology, vol. 49, No. 5, pp. 1968-1981, 2000.

M. Lanoiselée and P. Siohan, "Analog front end design for gigabit power line communication," in 2012 IEEE International Symposium on Power Line Communications and its Applications, 2012, pp. 170-175.

N. Okazima, Y. Baba, N. Nagaoka, A. Ametani, K. Temma, and T.Shimomura, "Propagation Characteristics of Power Line Communication Signals Along a Power Cable Having Semiconducting Layers," IEEE Transactions on Electromagnetic Compatibility, vol. 52, No. 3, pp. 756-769, 2010.

Peng, W. Tämeberg, E. Fitzgerald, and M. Kihl, "Massive mimo pilot scheduling over cloud ran," in 16th Swedish National Computer Networking Workshop (SNCNW 2020), May 2020.

R. C. Silva, E. C. M. Costa, S. Kurokawa, and J. Pissolato, "Mutual coupling modeling in transmission lines directly in the phase domain," in 2011 IEEE Electrical Power and Energy Conference, 2011, pp. 374-379.

T. Shikama, T. Watanabe, and T. Mizuno, "Delay analysis of the selective-repeat ARQ with the per flow re-sequencing," in IEEE International Conference on Communications, 2005. ICC 2005. 2005, vol. 1, 2005, pp. 26-32 vol. 1.

"Technical Report on Transport network support of IMT-2020/5G, v0," Telecommunication Standardization Sector of ITU, Feb. 2019.

\* cited by examiner

METHOD AND SYSTEM FOR COMMUNICATING DATA OVER RESIDENTIAL POWER LINES

CROSS REFERENCE TO RELATED APPLICATIONS

This application claims the benefit of priority of U.S. Provisional Patent Application No. 63/055,107 filed Jul. 22, 2020, which is hereby incorporated by reference.

FIELD

The present disclosure relates generally to telecommunications. More particularly, the present disclosure relates to data communications using residential power lines.

BACKGROUND

The following references are hereby incorporated by reference and mentioned in the description by reference to their assigned item number appearing in square brackets.
[1] "Cisco Visual Networking Index: Forecast and Methodology 2017-2022," February 2019.
[2] F. Boccardi, R. W. Heath, A. Lozano, T. L. Marzetta, and P. Popovski, "Five disruptive technology directions for t5G," IEEE Communications Magazine, vol. 52, no. 2, pp. 74-80, 2014.
[3] M. Qian, Y. Wang, Y. Zhou, L. Tian, and J. Shi, "A super base station based centralized network architecture for 5G mobile communication systems," Digital Communication Networks, vol. 1, no. 2, pp. 152-159, April 2015.
[4] A. Mathur, M. R. Bhatnagar, and B. K. Panigrahi, "Performance evaluation of PLC with log-normal channel gain over Nakagami-m additive background noise," in 2015 IEEE 26th Annual International Symposium on Personal, Indoor, and Mobile Radio Communications (PIMRC), 2015, pp. 824-829.
[5] L. Di Bert, P. Caldera, D. Schwingshackl, and A. M. Tonello, "On noise modeling for power line communications," in 2011 IEEE International Symposium on Power Line Communications and Its Applications, 2011, pp. 283-288.
[6] "Technical Report on Transport network support of IMT-2020/5G, v0," Telecommunication Standardization Sector of ITU, February 2019.
[7] C. A. Duarte, "Self and mutual transmission line impedance estimation by means of the non-linear least squares method," in Simposio Internacional sobre la Calidad de la Energia Eléctrica —SICEL, vol. 7, 2013.
[8] R. C. Silva, E. C. M. Costa, S. Kurokawa, and J. Pissolato, "Mutual coupling modeling in transmission lines directly in the phase domain," in 2011 IEEE Electrical Power and Energy Conference, 2011, pp. 374-379.
[9] R. Hashmat, P. Pagani, A. Zeddam, and T. Chonave, "A channel model for multiple input multiple output in-home power line networks," in 2011 IEEE International Symposium on Power Line Communications and Its Applications, 2011, pp. 35-41.
[10] M. Zimmermann and K. Dostert, "Analysis and modeling of impulsive noise in broad-band powerline communications," IEEE Transactions on Electromagnetic Compatibility, vol. 44, no. 1, pp. 249-258, 2002.
[11] L. Stadelmeier, D. Schill, A. Schwager, D. Schneider, and J. Speidel, "Mimo for inhome power line communications," in 7th International ITG Conference on Source and Channel Coding, 2008, pp. 1-6.
[12] "Common Public Radio Interface (CPRI); Interface Specification," CPRI Specification V7.0 (2015-10-09), October 2015.
[13] J. Proakis and M. Salehi, Digital Communications, 5th edition. McGraw-Hill Higher Education, 2008.
[14] A. Mahmood and R. Jantti, "Packet error rate analysis of uncoded schemes in block-fading channels using extreme value theory," IEEE Communications Letters, vol. 21, no. 1, pp. 208-211, 2017.
[15] D. Divsalar and J. Yuen, "Performance of concatenated reed-solomon/viterbi channel coding," Telecommunications and Data Acquisition Progress Report, 09 1982.
[16] M. Tomlinson, C. J. Tjhai, M. A. Ambroze, M. Ahmed, and M. Jibril, Reed—Solomon Codes and Binary Transmission. Springer International Publishing, 2017.
[17] MoonYoung Choi, Yu-Dong Yao, and H. Heffes, "Throughput analysis of a class of selective repeat ARQ with multi-copy re-transmissions," in 53rd IEEE Vehicular Technology Conference (VTS), vol. 3, 2001, pp. 1933-1936 vol. 3.
[18] R. Hashmat, P. Pagani, A. Zeddam, and T. Chonavel, "Mimo communications for inhome plc networks: Measurements and results up to 100 mhz," in ISPLC2010, 2010, pp. 120-124.
[19] M. Lanoiselée and P. Siohan, "Analog front end design for gigabit power line communication," in 2012 IEEE International Symposium on Power Line Communications and Its Applications, 2012, pp. 170-175.

In 5G communication systems, the user mobile data traffic is expected to increase by 7 folds since 2017, where the average mobile network data rate is expected to reach 28.5 Mbps in 2022 [1]. Deployment of low-power small base stations (BSs) is considered the most effective solution to meet this demand [2]. This is particularly critical in the case of indoor service provisioning, in which the antennas should be located as close to the users as possible for line-of-sight (LOS) transmissions.

Centralized Radio Access Network (C-RAN) architecture has been defined in 5G new radio (NR). In C-RAN, the radio functionalities and the base-band processing are separated; the remote radio units (RRUs) are located at the site, whereas the base-band units (BBU)s are clustered at a central office. The BBU and RRU are connected by a high-speed and low-latency link, referred to as the front-haul [3]. With C-RAN, a common way of achieving indoor coverage is by placing RRUs inside the indoor chambers while connected to the outdoor BBUs via a high-speed link, such as optical fiber.

However, installation of fiber optic based front-hauls for indoor services could be expensive if not impossible, due to the requirement for infrastructural alteration. On the other hand, power-line communication (PLC) has been deployed for broadband data transmissions for various applications such as home entertainment and internet services. The ubiquity of the residential power-lines has made the PLC as a promising candidate for any indoor wireless system.

To take power lines as the media of 5G NR front-hauls, many issues arise due to the harsh nature of power lines which are originally used for electricity transportation. The PLC channel is time-varying with Log-normal deep frequency dependent attenuation, which directly impacts the signal transmission [4]. A PLC channel is subject to many types of noises that cannot be described as additive white Gaussian noise (AWGN). According to their time-domain nature, the PLC noises can be classified into Background noise and Impulsive noise [5]. The spontaneous nature of the impulsive noise certainly cause a devastating damage to the data transmitted over the power-lines, and such damages can hardly be recovered by any coding mechanism. Thus, although mitigating the effect of the impulsive noise has been widely reported in the literature, they are not effective due to ignorance of the noise characteristics.

It is, therefore, desirable to provide a system whereby residential powerlines can be used to reliably provision indoor coverage under 5G NR.

SUMMARY

It is an aspect of the present disclosure to obviate or mitigate at least one disadvantage of previous powerline communication systems.

In a first aspect, the present disclosure provides a method for communicating common protocol radio interface (CPRI) frames using power lines. The method includes transmitting the frames from a transmitter external to a building onto the power lines for receipt by a receiver in the building; compensating for noise present in the power lines, including by sensing a peak to average power ratio (PAPR) of the power lines to be greater than a predetermined threshold. When the sensed PAPR is greater than the predetermined threshold, the transmitter is controlled to hold a current frame from being transmitted, and the receiver is controlled to discard an incoming frame. Retransmission of the held frame and enabling receiving of the receiver is initiated when the PAPR is sensed to be less than the predetermined threshold.

In the first aspect, compensating for noise includes compensating for background noise present in the power lines based on a known noise model using worst-case scenario parameters.

In a second aspect, the present disclosure provides a system for communicating common protocol radio interface (CPRI) frames using power lines. The system includes a central unit, a distributed unit, a first gateway device, a second gateway device and a receiving unit. The central unit is configured to transmit data over a dedicated telecommunications line. The distributed unit is located outside of a building and configured to demultiplex a CPRI stream received from the dedicated telecommunications line. The first gateway device is configured to receive the CPRI stream from the distributed unit and to apply the CPRI stream onto a three-phase power line providing power to the building. The second gateway device is configured to receive one of the single phase lines containing a phase/live wire, a neutral wire and a protective earthing wire. The first gateway device and the second gateway device are further configured to compensate for noise present in the power line, including by sensing a peak to average power ratio (PAPR) of the power line to be greater than a predetermined threshold, and executing the following when the sensed PAPR is greater than the predetermined threshold: controlling the first gateway device to hold a current frame from being transmitted, and controlling the second gateway device to discard an incoming frame. Retransmission of the held frame by the first gateway device and enabling receiving by the second gateway device is initiated when the PAPR is sensed to be less than the predetermined threshold. The receiving unit inside of the building is coupled to the second gateway device configured to receive the CPRI stream.

In an embodiment of the second aspect, a staging buffer is configured to receive frames from the receiver for streamed output to an antenna. In this embodiment the staging buffer is sized to take into account end-to-end delay between the distributed unit and the output of the receiving unit.

BRIEF DESCRIPTION OF THE DRAWINGS

Embodiments of the present disclosure will now be described, by way of example only, with reference to the attached Figures.

DETAILED DESCRIPTION

Generally, the present disclosure provides a method and system for using residential power lines as part of C-RAN front-hauls to support the transportation of time division multiplexed (TDM) CPRI (Common Protocol Radio Interface) frames for 5G NR indoor service provisioning. Particularly, the embodiments describe a novel device, namely CPRI-PLC-Gateway (CPG), for enabling the power lines to support CPRI streams in presence of the noisy PLC environment.

More specifically in the present embodiments, components of the CPG are installed at a distributed unit (DU) typically outside of a building and a radio unit (RU) typically within a building to form a CPG pair, which creates a virtual tunnel that ensures the CPRI hyper-frames to be transported with satisfied data rate and bit error rate (BER). Other novel techniques are employed to address possible jitter and delay in the delivery of hyper-frames, if required in order to comply with the particular standard.

This is achieved by the two main functional modules of the proposed CPG, namely, singular value decomposition SVD process and impulsive noise detection and re-transmission (IND-Re) incorporated with hybrid automatic repeat request (HARQ). It should be noted that HARQ is one example retransmission scheme that could be used, and alternate embodiments can employ other types of retransmission schemes. The disclosed system and methods can shape the power lines into qualified CPRI links in supporting the 5G NR indoor services.

Figure 1:
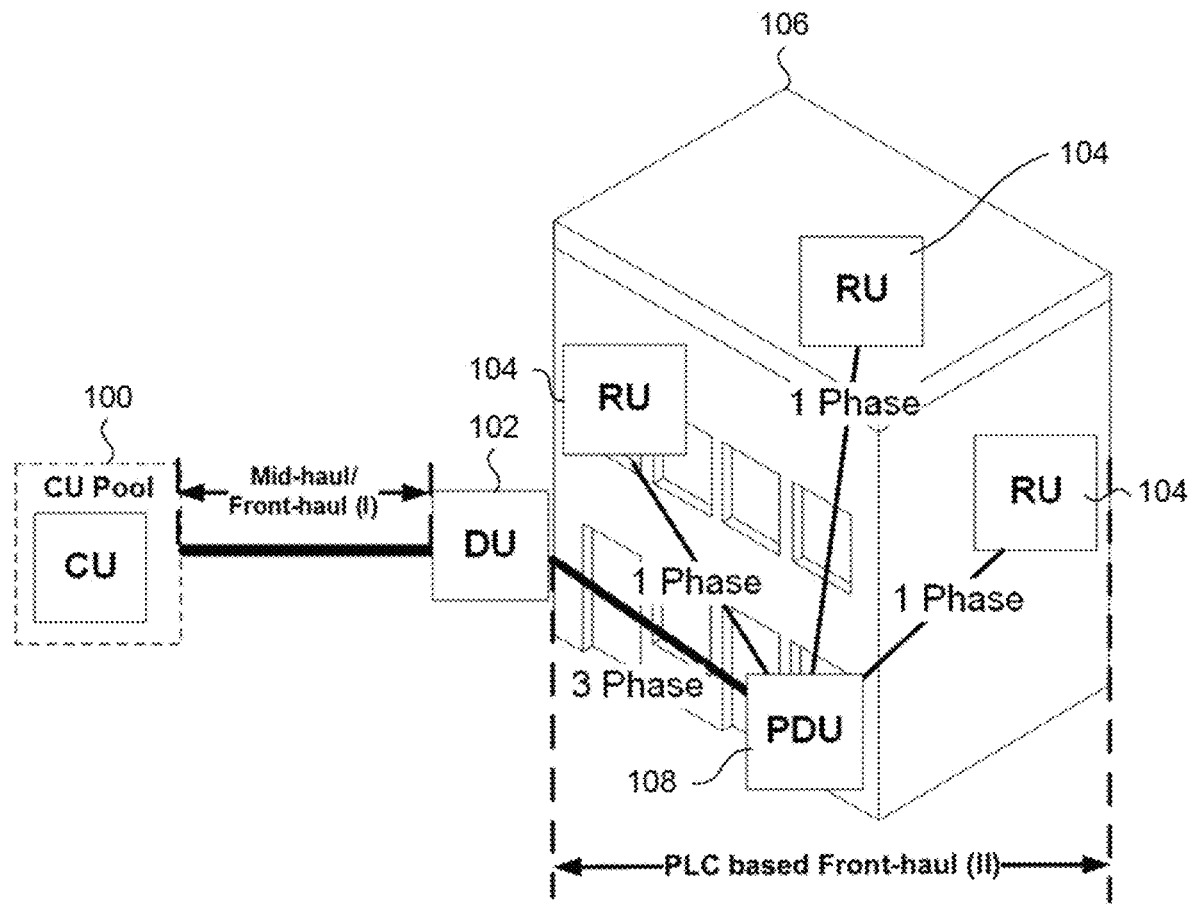
FIG. 1 is a diagram illustrating a power line communication system, according to a present embodiment.

In a specific example of the present embodiment, a split C-RAN system is adopted as demonstrated in FIG. 1, where a conventional BS is divided into three entities: Central Unit (CU) 100, Distributed Unit (DU) 102, and Radio Unit (RU) 104. The DU 102 in the present embodiments includes a CPRI module configured to follow CPRI specifications and standards. Similarly, the RU 104 includes a CPRI module.

There can be multiple RU's located within the building 106. The CU 100 is located at the central office and connected to the DU 102 via the first segment of front-haul (I)/mid-haul [6], mostly on an optical fiber link carrying the eCPRI or CPRI signal, or some similar high-speed signal transmission medium. The DU is further connected to the RUs 104 distributed in each indoor chambers via the second segment of the front-haul (II) carrying digital CPRI hyperframes.

In this example embodiment, each DU 102 and RU 104 is connected with the CPG, respectively, where the CPG attached with the DU 102 is denoted as D-CPG and R-CPG respectively. The CPG is a plug-and-play device that can be deployed to interface between the front-haul system and the power lines without any modification to the DU 102 and RU's 104. It uses a high-pass filter (HPF) to obtain the PLC signals. In specific, the D-CPG firstly connects to the indoor power distribution unit (PDU) 108 via a three-phase line. Beyond the PDU 108, each apartment chamber within the building 106 receives one of the single phase lines containing 3 wires: the Phase/Live (P), Neutral (N) and protective earthing (PE) wires, by which an RU 104 attached with the R-CPG is connected.

It should be noted at this time that the present embodiments are configured for three-phase power supply, which is commonly used for supplying power to residential and commercial buildings. The embodiments can easily be scaled to accommodate power systems that have any number of phases. For residential homes and other facilities that receive 1 or 2 phases of power, the embodiments disclosed still apply with the exception that there is no need for a singular value decomposition SVD process.

Figure 2:
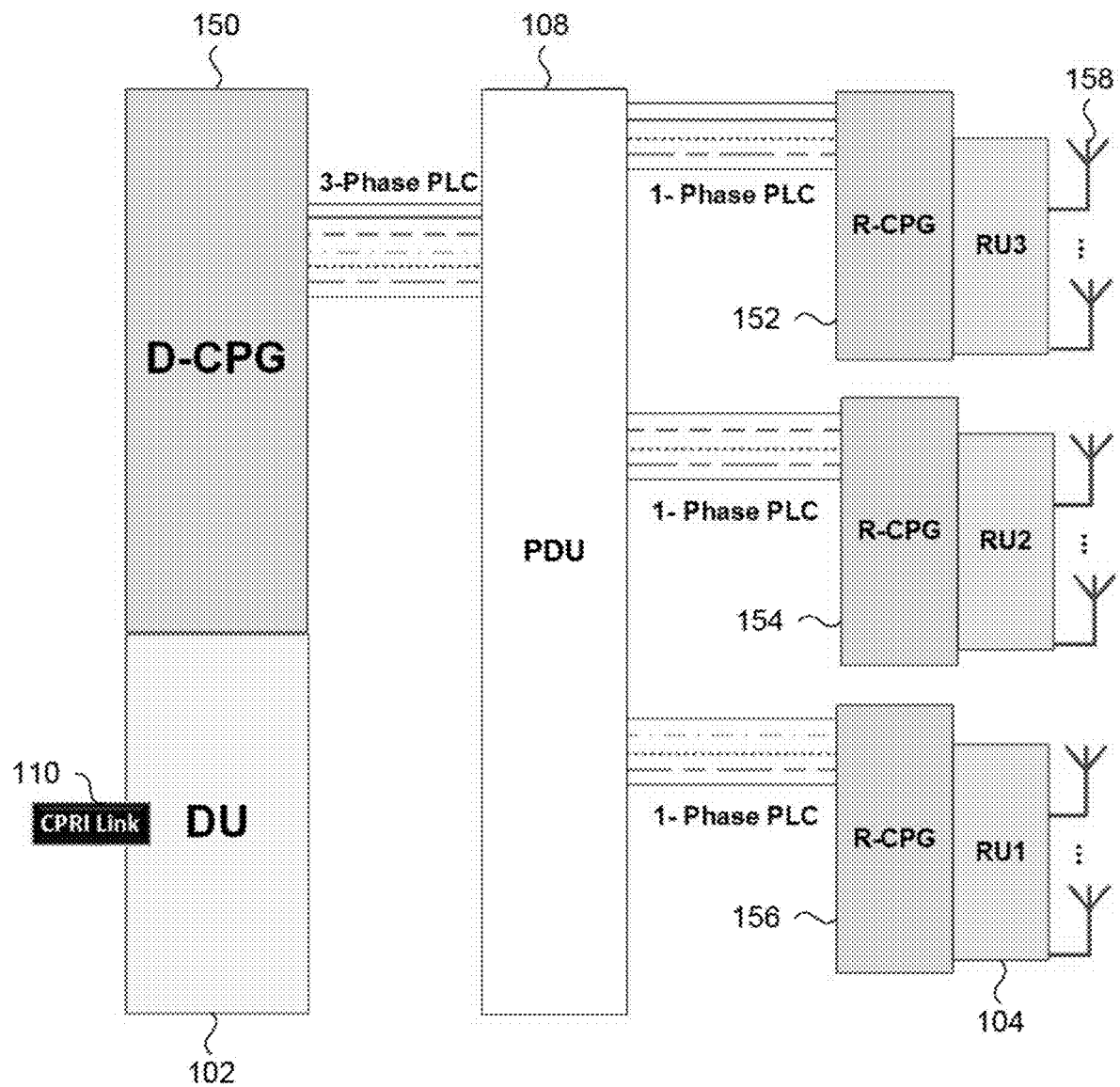
FIG. 2 is a block diagram showing a CPRI-PLC-Gateway used in the system of FIG. 1, according to a present embodiment.

FIG. 2 shows a functional diagram of the proposed PLC based front-hauling system, according to a present embodiment. Here, the DU 102 serves as a TDM hub that multiplexes/de-multiplexes the CPRI streams from the CPRI link 110 between the CU 100 (not shown) and the RUs 104. In FIG. 2 only the RU "RU1" is labelled with reference number 104. The D-CPG 150 is configured to execute signal conditioning and error correction to compensate for the aforementioned PLC noise effects that degrade signal integrity during hyper frame transmission to the PDU 108. Identically configured R-CPG's 152, 154 and 156 execute a similar function one the hyper-frames received from the PDU 108. The system shown in FIG. 2 supports both downlink and uplink traffic. In order to support full-duplex operation, the PLC system can be configured as an in band full duplex which would allow use of the same power lines for both uplink and downlink with doubled capacity.

The PDU 108 is a dummy device simply interfacing the three-phase line with the single-phase line with the following arrangement. If the 3 live wires of the three-phase line are P1, P2 and P3, then R-CPG 152 receives P1, neutral (N), and protective earth (PE) lines; R-CPG 154 receives P2, N and PE; and R-CPG 156 receives P3, N and PE. In other words, each of the separate 1-phase PLC leaving the PDU 108 are connected to a different R-CPG. Each antenna 158 of the RUs 104 is connected to the PDU 108 via one of the shared single-phase lines.

In the example shown in FIG. 2, the system is configured as one phase one R-CPG (3 phases=3 R-CPG) however in alternate embodiments, the system can be multiplexed using TDM, FDM or CDM to support more R-CPGs than presently shown.

In alternate embodiments where the building or residence receives one phase of power, there would be a single phase power line leaving the PDU 108 connected to one R-CPG, such as R-CPG 152.

In the present embodiments, it is necessary to designate each R-CPG 152, 154 and 156 to a specific port of the 3-phase line. A port is the difference in voltage between two 3-phase lines. Since a 3 phase power line has 3 live wires (P1, P2, P3) plus neutral (N) and PE (protective earth), then the maximum number of ports for a 3-phase system is 6 ports (P1N, P2N, P3N, P1 PE, P2PE & P3PE). Hence there are 6 ports for a 3 phase line, and it means the system can support up to 6 R-CPGs via a 3-Phase line of a building. Each port stands for a connected physical media going through one wire of the 3-phase line, PDU 108, and the corresponding one-phase line that connects with the R-CPG 152, 154 or 156. Each R-CPG 152, 154 and 156 is paired with D-CPG 150, that provisions a single base station.

The CPRI signal carried over front-haul (II) is affected by the PLC channel and can be modelled as shown in equation (1):

$$y = H_{PLC}\tilde{s} + n_{bg} + n_{imp} \quad (1)$$

where $H_{PLC} \in \mathbb{C}^{N_p \times N_p}$ is the block PLC MIMO channel over the three-phase line, $N_p$ is the total number of differential ports over the three-phase power line and $\tilde{s} \in \mathbb{C}^{N_p \times 1}$ is the CPRI hyper-frames from DU to different RUs. The CPRI hyper-frames are exposed to the PLC background noises $n_{bg}$ and impulsive noises $n_{imp}$ which $\in \mathbb{C}^{N_p \times 1}$. By assuming balanced three-phase line with symmetrical components, the mutual coupling among the three main phase lines can be neglected [7]. Furthermore, The shunt admittance can be neglected as they contribute for (<5%) for power lines that are less than 80 Km in length [8]. Therefore, the interference between the different single-phase lines can be neglected in comparison to the noise and interference among the same single-phase lines. Based on this assumption, $H_{PLC}$ can be expressed as a block diagonal matrix as follows:

$$H_{PLC} = \begin{bmatrix} H_{1P_1} & 0 & 0 \\ 0 & H_{1P_2} & 0 \\ 0 & 0 & H_{1P_3} \end{bmatrix}$$

where, $$H_{1P_i} \in \mathbb{C}^{N_{P_i} \times N_{P_i}}$$

is the MIMO PLC channel over $i^{th}$ single-phase line, and $N_{pi}$ is number of ports in the same single-phase line, yielding the total number of ports over three-phase lines as $N_p = \Sigma_{i=1}^{3} N_{Pi}$. A single-phase MIMO PLC channel with 2 ports used for data transmission can be expressed as:

$$H_{1P_1} = \begin{bmatrix} P1N - P1N & P1N - P1PE \\ P1PE - P1N & P1PE - P1PE \end{bmatrix}$$

where the diagonal elements represent the co-channel coefficients, and the off-diagonal elements represent the cross-channel among the different ports of the single phase line.

For the present embodiments, the ICT OMEGA single input-single output (SISO) PLC channel model [9] is used in the frequency range of 1-300 MHz. The SISO PLC channel model is further extended to generate the MIMO channel for a single-phase PLC as illustrated in [9].

There are two types of noise existing in residential PLC, including the background noise and the impulsive noise. The former is caused by the operating home appliances and any possible radio source such as AM/FM broadcasting, while the later is due to the transient power surges due to the change of states of the appliances, power supplies, and components with high cut-off voltage [5]. The background noise is modelled as colored Gaussian noise [5] using the worst-case scenario parameters. The impulsive noise model used in the embodiments is illustrated below.

Upon the occurrence of impulsive noise, the noise power spectral density (PSD) becomes at least 10-15 dB higher than that of usual background noise for a time duration up to 100 µs in which a significant loss in data transmission will be caused [5], [10].

Three main aspects constitute an impulsive noise: the impulse amplitude, the inter-arrival time between the impulses, as well as the duration of each impulse [5]. The impulse amplitude $A_{imp}$ has been statistically modelled using different distributions. Middleton's Class A, Double-sided Beta and two term Gaussian distributions are among some of the models in the literature. In [5], the authors illustrated that the Middleton's Class A model is the best fit model to the measurements with inter-arrival time ($t_{iat}$) of an exponential nature with mean $\mu_{iat}$=10.1 ms. [5]. The width of the impulses ($t_w$) is represented by two terms Gaussian model presented in [5] with mean 4.7 µs.

The proposed CPG system of the present embodiments is a device aiming to enable the power line to serve as the front-haul link while being completely transparent to the CPRI protocol operations between the DU and RU. The main functions of the CPG are:

1) Reduction of BER via SVD processing and IND-Re in cooperation with HARQ.
2) Perform rate matching such that the effective rate along the power lines is no smaller than the rate of the upper CPRI transmission.

With multiple transmit/receive ports of the PLC system, the space dimension can be exploited using spatially multiplexing of several data streams onto the PLC MIMO channel, leading to increased capacity. Assuming perfect PLC channel estimation, SVD is applied on the MIMO PLC channel such that $H_{PLC}=U\Sigma V\dagger$, where the † symbol indicates the Hermitian operator of a matrix. The columns U and V consist of left and right singular vectors of $H_{PLC}$ respectively, and $\Sigma$ is a diagonal matrix whose diagonal entries are the singular values of $H_{PLC}$ [11]. The CPRI hyper-frames are pre-processed through multiplication by V at the transmitter side such that $\tilde{s}=Vs$ and post-processed through multiplication by U† at the receiver side such that $\tilde{y}=U\dagger y$. The received CPRI signal $\tilde{y}$ after the post-processing can be expressed as:

$$\tilde{y} = U\dagger y = U\dagger U\Sigma V\dagger \tilde{s} + U\dagger n_{bg} + U\dagger n_{imp}$$
$$= U\dagger U\Sigma V\dagger Vs + U\dagger n_{bg} + U\dagger n_{imp}$$
$$= \Sigma s + \widetilde{n_{bg}} + \widetilde{n_{imp}}$$

Since the impulsive noise is in several folds stronger than the background noise with a time span of 4-100 µs, it definitely damages one or two hyper-frames even with the SVD processing. Note that the bit errors can only be restored in the data plane that will cause considerable delay and additional processing overhead.

IND-Re in the present embodiments is configured to mitigate the malicious effect of impulsive noise by restoring the lost hyper-frames via a light-weight HARQ based re-transmission upon the detection of any impulsive noise exceeding a specific threshold. In specific, the proposed IND-Re has the transmitter and the receiver CPGs (i.e., D-CPG and R-CPG) to constantly sense the peak to average power ratio (PAPR), calculated as $10 \log_{10}(P_s/P_{mean})$, every one hyper-frame duration ($\Delta t$=66.67 µs). When the PAPR is greater than a certain threshold Th=10 dB as the background-to-impulsive noise ratio is set to ($\Gamma$=0.1), it indicates the occurrence of an impulsive noise event. Then the transmitter simply holds the transmission, while the receiver drops the currently received hyper-frame. Holding the transmission maintains the current hyper-frame during which the impulsive noise is detected in a buffer at the transmitter side and not sending it over the PLC until the noise impulse PAPR reduces below the acceptable threshold. The hyper-frame already in transmission during the detected impulsive noise event is disregarded at the receiver side. Once the system resumes transmission the transmitter re-sends the buffered frame.

It is noted that the threshold for determining an impulsive noise event can be set for a specific building or residence, that is sufficiently high for disrupting the integrity of any transmitted hyper-frames or other data signals over the PLC. The determination of this threshold can be done experimentally or by modelling/simulation. Similarly, the background noise for a specific building or residence can be determined through experimentation or by modelling/simulation.

The transmitter initiates HARQ to re-transmit the hyper-frame held due to the impulsive noise, while the receiver starts to take the next received hyper-frame, as soon as the PAPR is sensed to be lower than the set threshold.

According to the present embodiment, the following is a sequence of steps of a method for impulsive noise detection/retransmission (IND-Re). The inputs are $P_{mean}$ and $\Gamma$.

1. Set $10 \log_{10}(1/\Gamma)$, $\Delta t$=66.67 µs
2. Measure $P_s$
3. While $10 \log_{10}(P_s/P_{mean})$,>Th, Loop
    a. transmitter: hold hyper-frame transmission
    b. receiver: discard incoming hyper-frame
    c. measure $P_s$ over time=$\Delta t$
4. End
5. Transmitter: transmit new copy of receiver discarded CPRI hyper-frame
6. Receiver: accept incoming hyper-frame With the HARQ, the receiver acknowledges each received CPRI hyper-frame via the Vendor Specific Fields of the CPRI hyper-frames [12] in the reverse direction. The readily present frame check sequence (FCS) based on cyclic redundancy check (CRC) in the control and management (C&M) information of the CPRI hyper-frame is used for hyper-frame error checking [12].

Figure 3:
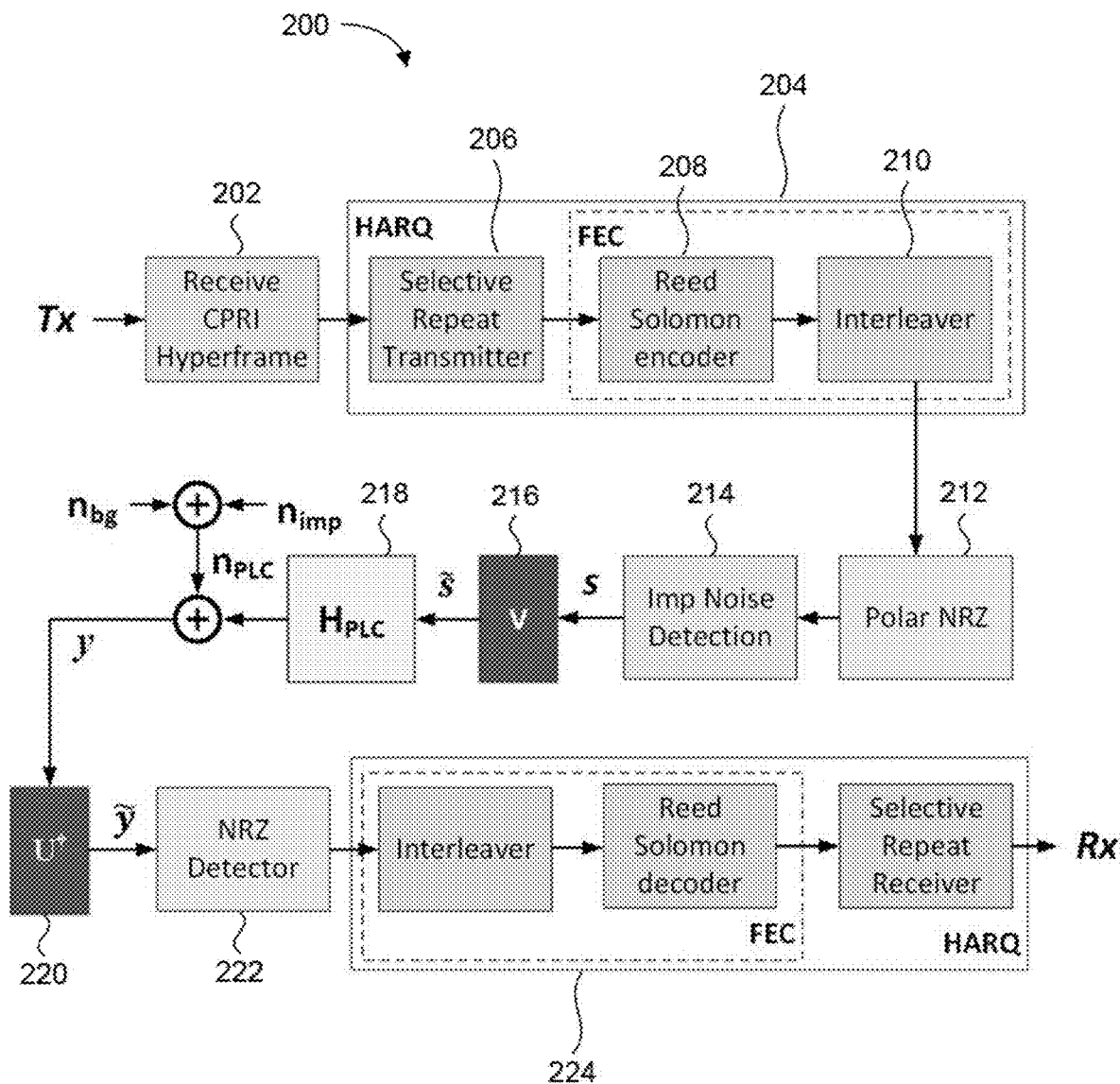
FIG. 3 is a block diagram showing further details of the CPRI-PLC-Gateway, according to a present embodiment.

FIG. 3 illustrates an example block diagram of the D-CPG 150 or R-CPG 152, 154 or 156 shown in FIG. 2, according to the present embodiment that includes the proposed IND-Re algorithm.

Following is a brief description of the functional blocks shown in FIG. 3 of the CPG module 200. The Receive CPRI HF (RCH) block 202 is used to interface and queue the HFs (hyper-frames) from the CPRI input (Tx). The HARQ block 204 implements the HARQ functions, which includes three sub-blocks: SR transmitter 206 and an FEC module further subdivided to show the Reed Solomon encoder 208 followed by an Interleaver 210. The HARQ block 204 is well known in the art. The Polar NRZ 212 is a modulator that generates the physical layer signal based on the input digital bitstream.

The Impulsive Noise Detector (IND) 214 includes a buffer that may hold the signal when an impulsive noise is detected, and power detectors for detecting the impulsive noise above the set threshold. This module will feedback to the RCH 202 regarding the detected impulsive noise characteristics. V is the block 216 which executes the singular value decomposition (SVD) operation on the signal at the sender. $H_{PLC}$ 218 is a model of the channel characteristics followed by post-processing by multiplying in the frequency domain with the transpose of the U matrix. Reference is made to the prior $H_{PLC}=U\Sigma V\dagger$ expression discussion.

U is the block 220 which executes the SVD operation on the received signal. The NRZ detector 222 is a receiver of the signal in the physical layer, which will output the corresponding digital bitstream. The HARQ block 224 implements the HARQ functions as the point of presence of the sender HARQ entity, having the same components as previously described for HARQ block 204.

It should be noted that while FIG. 3 shows a single CPG module 200, in the implementation embodiment of FIG. 2 this functionality exists in both the D-CPG 150 and each R-CPG 152, 154 and 156.

In an alternate embodiment, the CPG module 200 does not have the HARQ blocks 204 and 224. In such an embodiment, the output of the Receive CPRI HF (RCH) block 202 is connected directly to Polar NRZ 212 and the output of NRZ detector 222 becomes the Rx signal.

To make the PLC link transparent to the CPRI, the PLC data rate should be larger than the corresponding CPRI option of the current CPRI stream. Nonetheless, the effective data rate along the PLC line is strongly affected by the re-transmissions of the lost hyper-frames, which is in turn determined by the frame error rate (FER).

Following is analysis for finding the required system data rate to meet a given CPRI option. First is to estimate the BER $\overline{P}_b$ of the PLC line by integrating the BER in AWGN for P-NRZ, defined as $P_b = Q(\sqrt{2\gamma})$ over the log-normal distribution of the PLC channel $f_H(h)$ such that [13]:

$$\overline{P}_b = \int_0^\infty P_b f_H(h) dh = \int_0^\infty Q(\sqrt{2\gamma}) \frac{e^{-(ln(h)-\mu)^2/(2\sigma^2)}}{h\sigma\sqrt{2\pi}} dh$$

where Q(.) is the Gaussian Q-function, $\gamma=|h|^2 E_b/N_0$ is the instantaneous received signal to noise ratio (SNR), $E_b$ is the power per transmit bit and $N_0$ is the mean PLC noise power. The log-normal parameters of the three-phase PLC channel $\mu=-3.17151$ and $\sigma^2=1.38795$ are obtained through distribution fitting. Subsequently, the FER over the PLC fading channel $\overline{P}_e$, is computed by integrating the FER in AWGN, $P_e(\gamma)=1-(1-P_b)^N$, over the log-normal distribution of the average received SNR, $f(\gamma; \overline{\gamma})$ [14]:

$$\overline{P}_e = \int_0^\infty P_e(\gamma) f(\gamma; \overline{\gamma}) d\gamma$$
$$= \int_0^\infty (1-(1-Q(\sqrt{2\gamma}))^N) \frac{e^{-(ln(\gamma/\overline{\gamma})-\mu)^2/(2\sigma^2)}}{2\gamma\sigma\sqrt{2\pi}} d\gamma$$

where $\overline{\gamma}=E[|h|^2]E_b/N_0$ is the average received SNR with $$E[|h|^2] = e^{\left(\mu+\frac{\sigma^2}{2}\right)}$$

and E[.] denotes the expectation operation. The instantaneous received SNR is $\gamma=|h|^2 E_b/N_0$ and N is the number of bits in one CPRI hyper-frame.

To find the effect of HARQ on the data rate, it is required to find the effect of the interleaved Reed solomon (RS) forward error correction (FEC) as well as the effect of Selective repeat ARQ (SR) using maximum window size w=1/2 CPRI frame size). When applying RS(n,k), the improved average FER over the log-normal received SNR can be approximated as [15]:

$$\overline{P_{e_{RS}}} = \int_0^\infty P_{w_{RS}} \frac{e^{-(ln(\gamma/\overline{\gamma})-\mu)^2/(2\sigma^2)}}{2\gamma\sigma\sqrt{2\pi}} d\gamma$$

where $P_{w_{RS}}$ is the probability of interleaved RS FEC decoder error [16]:

$$P_{w_{RS}} = \sum_{i=t+1}^n \binom{n}{i} P_b^i (1-P_b)^{n-i} \ \& \ t = \frac{(n-k)}{2}$$

Using the FER after RS FEC, the effect of SR based HARQ over the data rate with T re-transmissions is defined as [17]:

$$\eta_{HARQ} = \frac{1}{1+E[T]} = (1-\overline{P_{e_{BS}}})(1-\overline{P_{e_{RS}}})$$

This is irrespective of the number T as only one frame copy is transmitted at a time and each frame is acknowledged by one Ack. The probability of loss of Ack is the same as FER because it is part of the frame header.

The effect of IND-Re over the data rate is calculated as:

$$\eta_{IND} = 1 - Pr_{imp}$$

where $Pr_{imp}$ is the probability that an impulse is detected is defined as:

$$Pr_{imp} = Pr[A_{imp} > \sqrt{Th \times P_{mean}}] \times Pr[t_{iat} \leq \Delta t]$$

where $A_{imp}$ is the amplitude of the impulsive noise and $t_{iat}$ is the inter-arrival time between the impulses. Based on the distribution models mentioned in paragraphs [0032]-[0033], $Pr_{imp}$ can be expressed as [5]:

$$Pr_{imp} = \left(1 - \int_0^{A_{imp}} \sum_0^\infty \frac{e^{-A} A^k}{k!} \frac{e^{-x^2/2\sigma_k^2}}{\sqrt{2\pi\sigma_k^2}} dx\right) \times \left(1-e^{-\Delta t/\mu_{iat}}\right)$$

with $\sigma_k^2 = \sigma^2 \left(\frac{(k/A)+\Gamma}{1+\Gamma}\right)$

Consequently, the matched effective data rate ($R_{eff}$) along the PLC line corresponding to the CPRI option (R) can be expressed a $$R_{eff} = R/((1-OH_{RS}) \times \eta_{HARQ} \times \eta_{IND})(bps)$$

where $OH_{RS}=n/k$ is the overhead introduced due to RS(n, k) FEC. Using the same methodology the effective system throughput is calculated as:

$$Thrpt = C_{MIMO} \times (1-OH_{RS}) \times \eta_{HARQ} \times \eta_{IND} (bps)$$

where $C_{MIMO}$ is the instantaneous capacity of the PLC MIMO channel.

Simulations have been conducted to test various approaches for communicating data over PLC lines, and specifically to analyze the bit error rate (BER) and frame error rate (FDR) of each approach.

Four Scenarios are Simulated:

Sc1: CPRI Only: Launching CPRI hyper-frames without any modifications onto the PLC lines.

Sc2: CPRI+HARQ: CPRI hyper-frames are sent over the power lines while enabling the HARQ type-I technique.

Sc3: CPRI+IND-Re: CPRI hyper-frames are launched onto the power lines while applying IND-Re.

Sc4: CPRI+HARQ+IND-Re: CPRI hyper-frames are launched onto the PLC lines while enabling HARQ type-I and IND-Re.

In all scenarios, polar non-return to zero (P-NRZ) is applied. The main evaluating metric for our system is the BER and FER. The instantaneous capacity ($C_{MIMO}$) of the PLC MIMO channel is calculated using the following equation [18].

$$C_{MIMO} = \sum_{n=1}^{N_f} \Delta f \sum_{i=1}^{N_p} \log_2 \left(1 + \frac{P_{T_x}(f_n)\lambda_i(f_n)}{N_{R_x}(f_n)N_p}\right) (bps)$$

where $\lambda_i(f_n)$ is the eigenvalues of $HH\dagger$ at a given frequency $f_n$. $P_{T_x}(f_n)$ is the transmitted power and $N_{R_x}(f_x)$ is the noise at the receiver. $N_f$ is the number of samples in the frequency range, $\Delta f$ is the sampling frequency used (frequency step) and $N_p$ is the number of transmit ports used [18].

The parameters used in the simulations are shown in Table I.

TABLE I

SYSTEM SIMULATION PARAMETERS USING CPRI OPTION 1

| | |
|---|---|
| $E_b/N_0$ range | 0-50 dB |
| Power Line Length | 800 m |
| MIMO PLC Ports (3-Phase) | 6 Tx/Rx ports |
| PLC BW/Port | 1-300 MHz |
| Chip Rate ($\Delta f$) | 3.84 MHz |
| HARQ limit/frame (T) | 4 re-transmissions |
| RS-FEC rate | (128, 132) |
| Interleaver rate | 32 |
| Selective Repeat Window | 75 Hyper-frames |
| IND-Re Threshold (Th) | 10 dB |
| IND-Re mean power ($P_{mean}$) | −115 dB |
| CPRI Hyper-frame size | 256 basic frames |
| CPRI Hyper-frame duration | 66.67 μs |
| CPRI Frame size | 150 Hyper-frames |
| CPRI Frame duration | 10 ms |

The regulations of general Electro-Magnetic Compatibility (EMC) have been respected; such that the maximum PSD is set to −50 dbm/Hz up to 30 MHz and to −80 dbm/Hz for higher frequencies [19].

Figure 4:
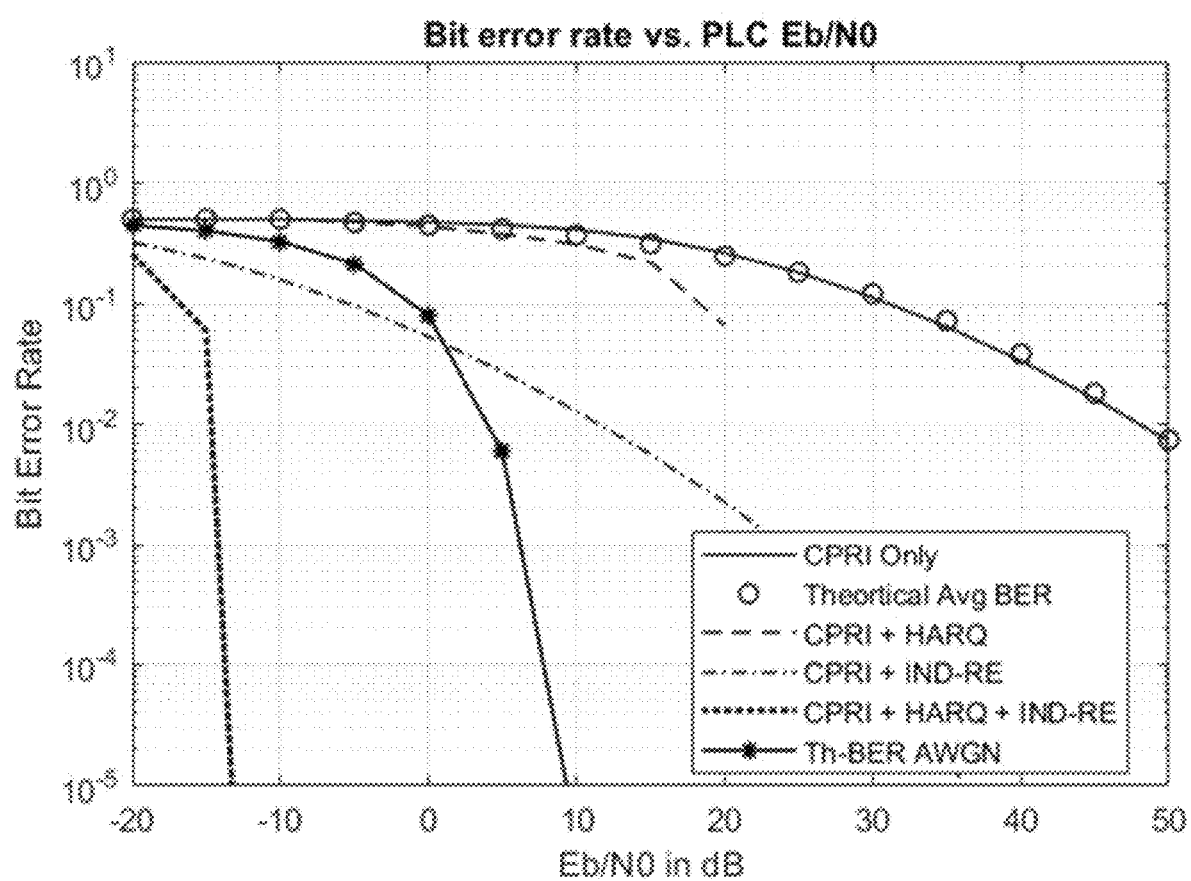
FIG. 4 is a graph showing BER (bit error rate) test results for various simulations of communicating data over PLC lines.
Figure 5:
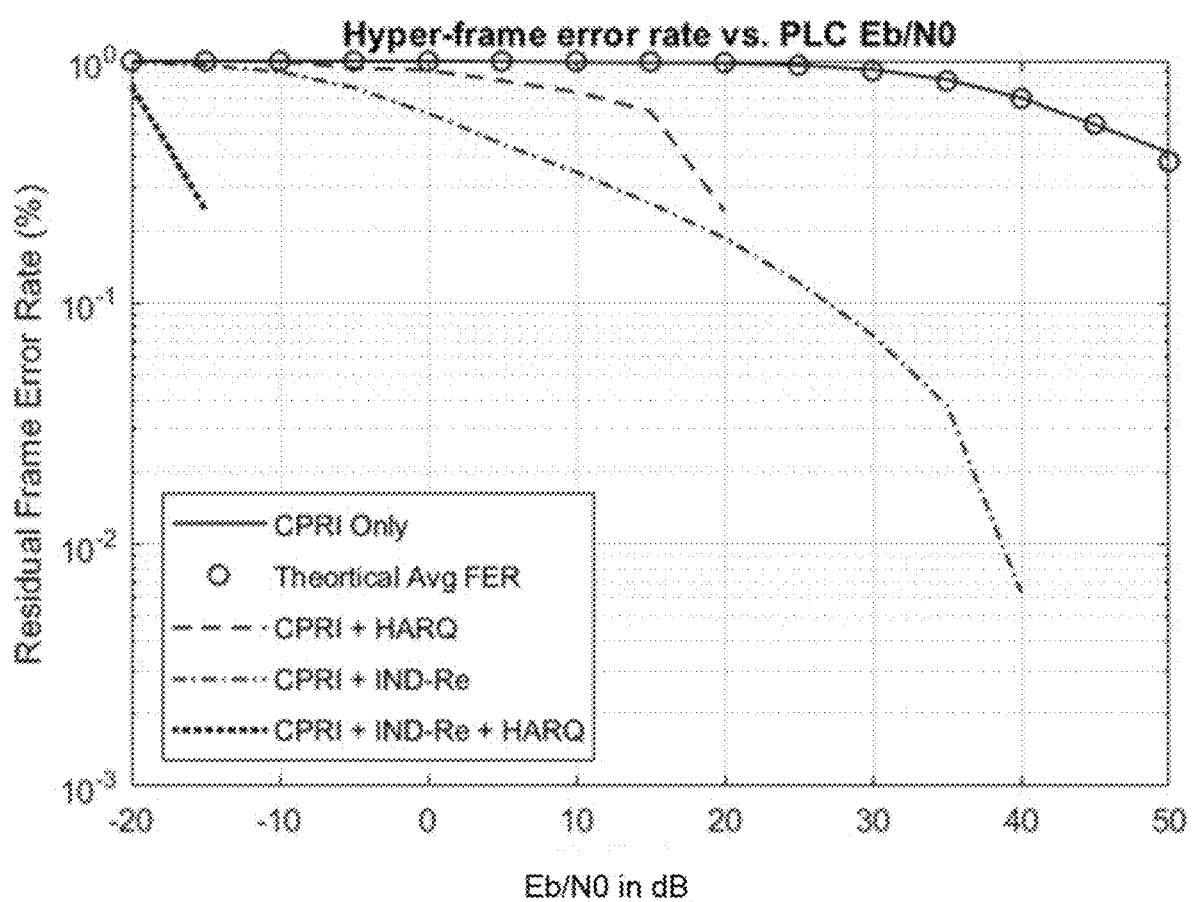
FIG. 5 is a graph showing FER (frame error rate) test results for the same simulations shown in FIG. 4.

FIG. 4 presents the system BER and FIG. 5 shows the hyper-frame FER for all the four scenarios. When CPRI signal is sent over PLC based front-haul without any modifications, BER and FER are extremely high even for high SNRs; therefore, its not possible to implement the system as such. HARQ improves the system performance, with imposed limitation of 4 times on the number of hyper-frame re-transmissions, for SNR higher than 15 dB the residual bit error rate is recorded as zero with $10^{13}$ simulated bits (i.e. BER <$10^{-12}$). Compared with bare CPRI, the use of IND-Re yields a clear positive impact on BER and FER. When IND-Re is applied, for SNR higher than 40 dB, the number of bits received in error reaches zero without any re-transmission by higher layers. It can be seen that zero residual BER and FER can be achieved under all the considered SNR range when both HARQ and IND-Re are used in the system simulations with $10^{13}$ bits and 474 hyper-frames simulated per SNR.

Accordingly, a PLC configuration using CPRI with IND-RE in one embodiment as a minimum presents a functioning system with acceptable performance. A PLC configuration using CPRI with IND-RE and HARQ (or similar retransmission system) in another embodiment will present superior performance.

Each of the four scenarios has been run 20 times per port, the mean and maximum capacity and effective throughput values at $E_b/N_0=35$ dB are shown in Table II below.

TABLE II

EFFECTIVE THROUGHPUT OUTCOMES FOR EB/N0 = 35 DB: MIMO PLC (6 × 6), SAME CIRCUIT, 10 RUNS

| Outcomes (Gbps) | Sc. 1 | Sc. 2 | Sc. 3 | Sc. 4 |
|---|---|---|---|---|
| Mean Sys. Cap. | | | 5.465 | |
| Max Sys. Cap. | | | 12.72 | |
| Mean Thrpt. | 0.83 | 0.6630 | 5.0977 | 4.9061 |
| Max Thrpt. | 2.0405 | 1.544 | 11.8721 | 11.4260 |

Figure 6:
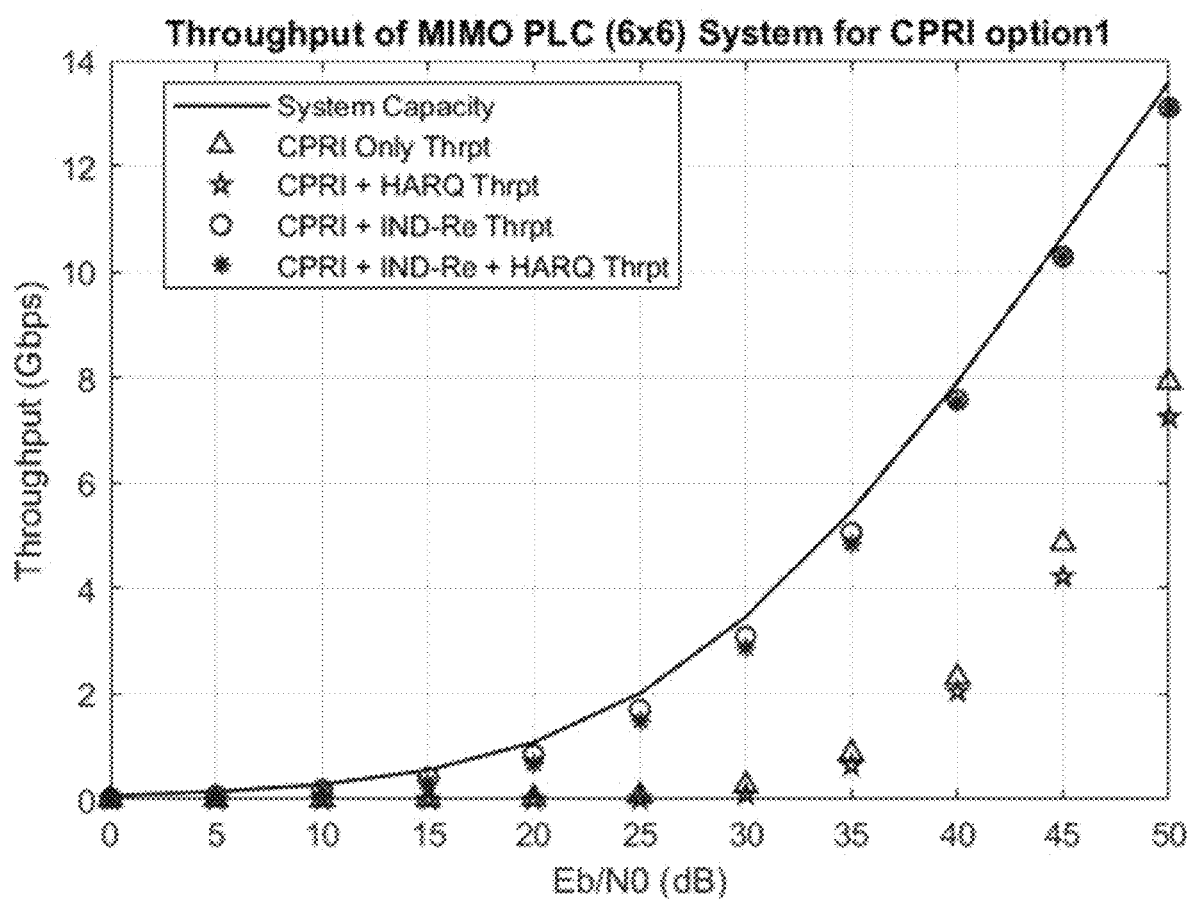
FIG. 6 is a graph showing the net throughput outcome for one run of the simulations shown in FIG. 4 vs SNR.

FIG. 6 shows the net throughput outcome for one of those runs verses SNR. Based on the mean throughput of Sc.4, the system can support up to CPRI option 4 with data rate of 3.072 Gbps. By expanding the bandwidth further in the ultra-high-frequency range, the residential PLC can support CPRI options with higher rates. The effective throughput when HARQ and IND-Re are used constitutes for approximately 89% of the system full capacity.

Figure 7:
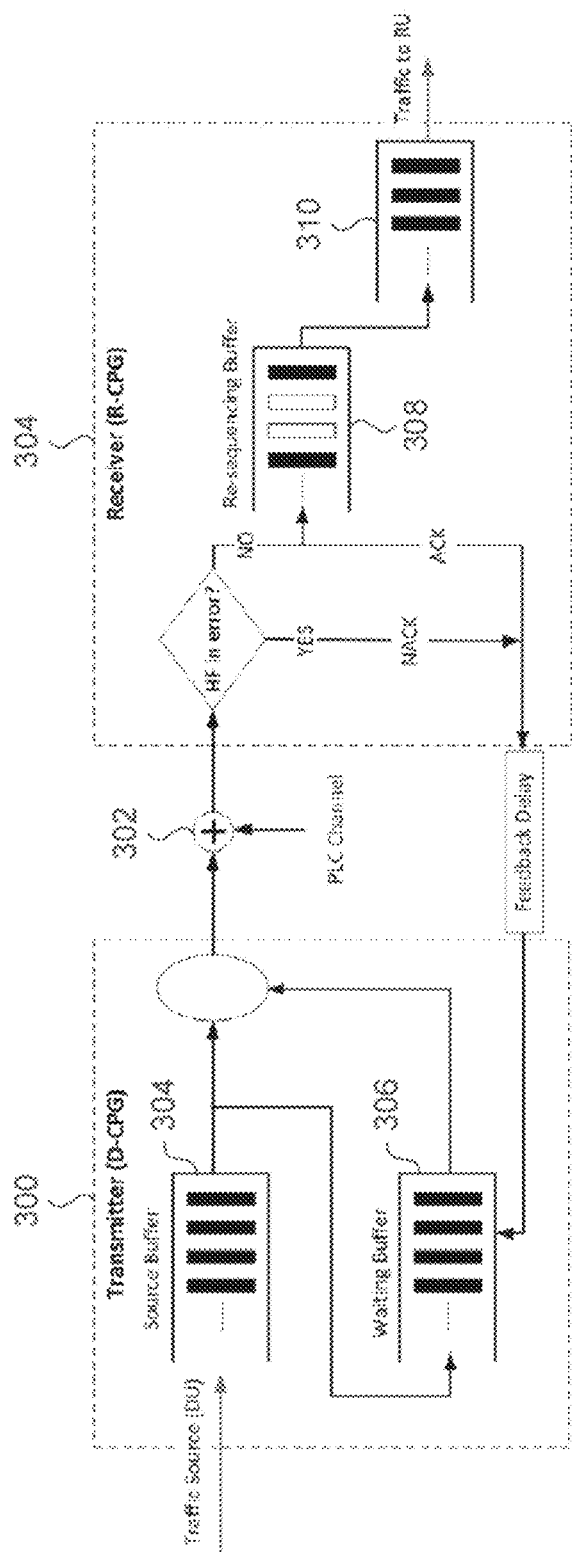
FIG. 7 is a diagram showing hyper frame dataflow with a staging buffer according to a present embodiment.

Some communication protocols impose strict limits on the amount of delay and jitter in the transmission of data. The PLC environment is especially hostile, but the previously described embodiments have been shown to be effective for minimizing BER and FER for the CPRI protocol. However, the IND-RE and HARQ enabled CPG embodiment can introduce delay/jitter due to the retransmission of frames, which will be more frequent than non-PLC communication systems. This is explained in further detail below with reference to FIG. 7, which is a functional diagram of an embodiment of the CPG system to illustrate hyper-for transmission flow over a PLC link. Shown in FIG. 7 are a D-CPG 300 coupled to the PLC channel 302 and an R-CPG 304.

Hyper-frames are received from the DU and stored in source buffer 304. As per the selective repeat (SR) process, each hyperframe (HF) has a unique identifier (hyper-frame number) assigned by the transmitter (D-CPG 300) and are sent over the PLC channel 302 in order. Once a hyper-frame is transmitted, a copy of it is saved in a waiting buffer 306 at the transmitter 300 until an acknowledgment (ACK) message is received from the receiver (R-CPG 304). If a non-acknowledgment (NACK) is received, the hyperframe is re-transmitted instantaneously before any other new hyper-frame. Once an ACK is received, the hyperframe is removed from the waiting buffer 306 and a new hyper-frame is transmitted. Due to the randomness of the transmission errors over the PLC channel 302, the hyperframes may be received out of order. When a hyper-frame with higher identifiers is received correctly it must wait in a resequencing buffer 308 until all lower identifier hyper-frames are received correctly or dropped. Hence this introduces a delay at the R-CPG 304 where the streaming of hyperframes stops and then resumes after the resequencing buffer 308 is filled. Due to the noisy nature of the PLC, the frequency that the resequencing buffer must wait for retransmitted hyperframes can be sufficiently high that delay/jitter constraints cannot be met for a particular protocol, such as CPRI for example.

To address this problem of jitter/delay, a staging buffer 310 is added to the output of the resequencing buffer 308 and sized to continuously stream out hyper-frames without jitter, ideally at a rate that is the same rate of the CPRI to maintain transparency to the end user. This compensates for the stop and start activity of the resequencing buffer 308 which may be occurring due to the retransmission of frames by the previously described CPG embodiments. Accordingly, there is some latency between the CPRI stream received at the DU 102 and at the RU 104.

The sizing of the staging buffer 310 should take into account the total end to end delay between receiving data at the D-CPG and outputting the data at the R-CPG.

The main components of the total end-to-end delay include the queuing at the transmitter until the new hyper-frame is transmitted, the transport delay through the channel, the re-sequencing delay at the receiver, and the delay due to IND-RE. The hyper-frame end-to-end delay can be expressed as:

$$t_{e2e} = t_q + t_{ts} + t_{rsq} + t_{IND}$$

where $t_q$ is the queuing delay, $t_{ts}$ is the transport delay, $t_{rsq}$ is the selective repeat re-sequencing delay and $t_{IND}$ is the delay introduced due to the use of IND-RE.

The queuing delay is the wait time for a new hyper-frame before beginning its transmission due to the re-transmission of older erroneous hyper-frames. Determination of the queuing delay can be simplified by eliminating the dependence between the queuing process and the history of the hyper-frame transmission process.

The transport delay is delay through the channel, which includes is the transmission delay and the propagation delay combined. The re-sequencing delay is delay at the receiver caused by the need for the residing or storage of the successfully transmitted hyper frames in the resequencing buffer. The use of IND-Re introduces delay due to the holding and retransmission of the hyper-frames.

Once $t_{e2e}$ is known for the system, then the staging buffer size can be obtained using Little's law such that $$L_{IB} = \overline{(t_{e2e})} \times \text{incoming traffic rate}$$

The incoming traffic rate is the mean arrival rate of the hyper-frames at the transmitter side assuming no hyper-frame loss over the channel. This buffer size can be considered the minimum staging buffer size for the system.

For any implemented system, these delays can be either calculated, modeled, simulated or experimentally derived using known or published techniques and worst case parameters. Following are example modeling to arrive at the delays. It should be understood that alternate modelling techniques can be employed.

Figure 8:
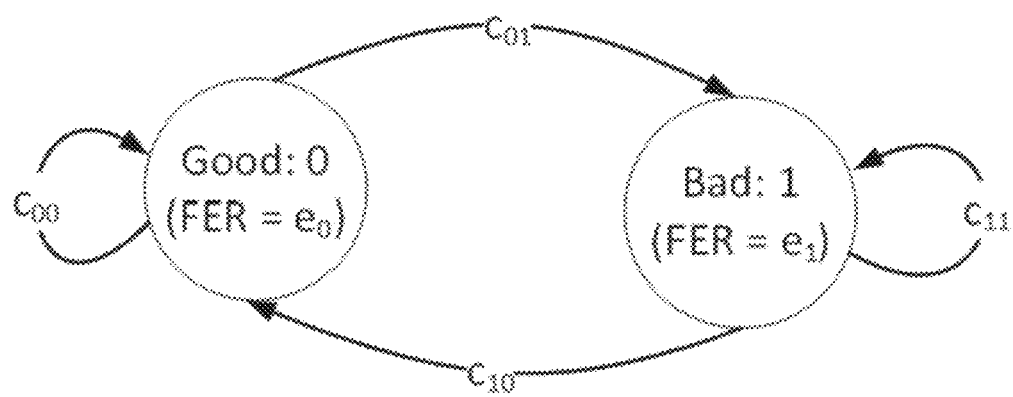
FIG. 8 is an illustration of Gilbert-Elliot's Two-state Markov channel model for nonstationary channel.

The PLC channel is first modelled using the Gilbert-Elliot channel model which is the simplest Finite State Markov Channels (FSMC) model for non-stationary time varying channel. It is a binary channel model determined by a two state finite-state Markov Chain. The Good State denoted as state 0; it is the state characterized by low frame error rate (FER) $e_0$. The bad or burst state denoted as state 1 is where the FER ($e_1$) is high such that $e_0 \ll e_1$. As shown in FIG. 8, $c_{01}$, $c_{10}$, are the transition probabilities from state 0 to state 1 or from state 1 to state 0 respectively. $c_{00}$, $c_{11}$ is the transition probability from state 0 to itself and state 1 to itself respectively.

To simplify the model, it is assumed that one time slot (Ts) is the equivalent to the transmission of one hyper-frame (66.67 μs in case of CPRI). Furthermore, it is assumed that the noise bursts last for at least one time-slot. The noise bursts could last for multiple time slots but in this case the analysis is performed on time slot basis by modelling the channel maintaining its current state. Such that $c_{10} = 1 - c_{11}$ and $c_{00} = 1 - c_{01}$ where for time slot k: $c_{zj} = \Pr[c(k+1) = j | c(k) = z]$ z, j ∈ {0,1}. The channel transition matrix of the Markovian model on the frame level can be defined as:

$$C = \begin{bmatrix} c_{00} & c_{01} \\ c_{10} & c_{11} \end{bmatrix}$$

The mean number of hyper-frames transmitted while in Bad state, i.e. the mean burst length $\overline{b_b}$ is defined as $$\overline{b_b} = \frac{1}{1 - c_{11}}$$

and the mean number of hyper-frames transmitted while in Good state, i.e. the mean state holding time $\overline{b_g}$ can be defined as:

$$\overline{b_g} = \frac{1}{1 - c_{00}}$$

Let $E_d | s_n$ be the event that the n-th received copy of HF is received in error, given that the channel was in state $s_n$ during the transmission of such copy. Then the probability of such event $\Pr\{E_d | s_n\}$ is defined as:

$$Pr\{E_d | S_n\} = \begin{cases} 1 - (1 - \epsilon_0)^L, & \text{if } S_n = 0 \\ 1 - (1 - \epsilon_1)^L, & \text{if } S_n = 1 \end{cases}$$

where $\epsilon_0$ is the bit error rate (BER) in the Good state and $\epsilon_1$ is the bit error rate (BER) in the Bad state. L is the number of bits within one hyper-frame. Clearly, the above equation is the definition of the instantaneous frame error rate (FER) with no forward error correction (FEC) implemented. Therefore, the instantaneous FER per channel state can be defined as:

$$e_0 = Pr\{E_d | s_n = 0\}$$

and $$e_1 = Pr\{E_d | s_n = 1\}$$

Given $e_0$ & $e_1$ then the mean FER can be defined as:

$$\overline{e} = \frac{c_{10} e_0 + c_{01} e_1}{c_{10} + c_{01}}$$

The queuing delay is introduced at the transmitter due to the re-transmission of erroneous previous hyper-frames. Modelling the PLC channel using the two-state Gilbert-Elliot channel model discussed above, an analysis of the queuing delay over the PLC based section of the front-haul is conducted.

Figure 9:
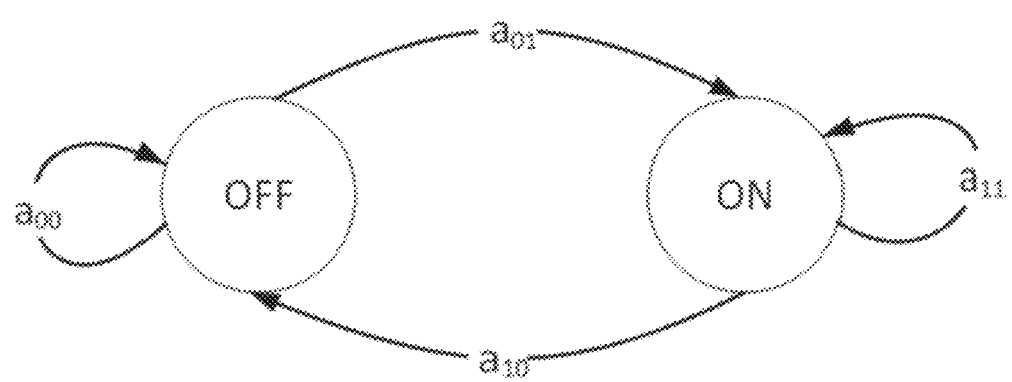
FIG. 9 is an ON-OFF source model.

The arrival process of CPRI hyper-frames at the transmitter side is represented by an N-state Markov process. Of interest is the ON-OFF source model (N=2) as it's the most commonly used model of network traffic including CPRI and eCPRI. Enforced is the assumption of ideal SR ARQ approximation, therefore eliminating the dependence between the queuing process and the history of the HF transmission process; which simplifies the analysis. Based on the ON-OFF Markovian source model in FIG. 9, where $\alpha_{01}$=Pr{Prob. of arrival of new HF in current Ts with no arrival in previous Ts}, $\alpha_{10}$=Pr{Prob. of no arrival of new HF in current Ts with one new arrival in previous Ts}. Moreover, $\alpha_{00}=1-\alpha_{01}$=Pr{Prob. of no new HF arrival in current Ts with no arrival in previous Ts}, and, $\alpha_{11}=1-\alpha_{10}$=Pr{Prob. of arrival of new HF in current Ts with one new arrival in previous Ts}.

At time slot k, let the queue length at the transmitter be represented as $q_j(k)$ with the channel state j and the source state m at this time slot. To find the number of hyper-frames in the queue at time slot (k+1) with the channel state is j and the source state i at this time slot where $i, \& j \in \{0,1\}$.

$$\therefore q_{i,j}(k+1) = \begin{cases} q_{m,j}(k) + a(k) - d_j(k), & \text{if } q_j(k) \neq 0 \\ q_{m,1-j}(k) + a(k) - d_{1-j}(k), & \text{if } q_{1-j}(k) \neq 0 \\ a(k), & \text{if } q_j(k) = 0 \text{ or} \\ & q_{1-j}(k) = 0 \end{cases}$$

where a(k) is the number of new hyper-frame arrivals in time slot k. Because of the assumption that one hyperframe is sent per time slot and that the arrival process is an ON-OFF process then $a(k) \in 0,1$. The departure of a hyperframe from the system is referred to as $dj(k) \in \{0,1\}$ while the channel is in a state $j \in \{0,1\}$.

Assuming the current channel state ($CS_k$) is j and setting the limit of re-transmissions of a failed HF to a maximum of $L_r$ times then drop it, then the probability of departure is defined as:

$$d_j = Pr\{d_j(k) = 1\}$$
$$= Pr\{\text{HF delivered} \mid CS_k = j\} \times$$
$$Pr\{\text{HF dropped } L_r \text{ re-trans} \mid CS_k = 1-j\}$$

Also, the probability of departure if the current channel is in state 1-j is defined as:

$$d_{1-j} = Pr\{d_{1-j}(k) = 1\}$$
$$= Pr\{\text{HF delivered} \mid CS_k = 1-j\} \times$$
$$Pr\{\text{HF dropped } L_r \text{ re-trans} \mid CS_k = 1-j\}$$

When the current channel state ($CS_k$) is j, then the probability of no departure (HF re-transmission) is defined as:

$$t_{1-j} = Pr\{d_{1-j}(k) = 0\}$$
$$= \sum Pr\{\text{HF re-trans} < L_r \mid CS_k = 1-j\}$$

The probability of no departure (HF re-transmission), when the channel is in the state $CS_k=1-j$, is defined as:

$$t_j = Pr\{d_j(k) = 0\}$$
$$= \sum Pr\{\text{HF re-trans} < L_r \mid CS_k = j\}$$

The receiving of a hyper-frame in error or successfully is only dependent on the current channel state and is independent of the transition in the channel state. Therefore, for a certain current channel state ($CS_k$=j), the received HF state transition diagram based on the number of consecutive receive failures of a hyper-frame at the receiver side can be represented as in FIG. 10. These states will be referred to as HF states/HF steady states. Defining the probability of receiving a new transmitted HF at the receiver as ($\alpha$) and referring to FIG. 10, the probability of a HF departure from the system given a certain channel state is calculated as:

$$d_j = Pr\{\text{HF steady state } S_0 \mid CS_k = j\} = \frac{1}{1 + \alpha \cdot e_j + \alpha \cdot e_j^2 + \ldots + \alpha \cdot e_j^{L_r}}$$

$$= \frac{1}{1 + \frac{\alpha \cdot e_j - \alpha \cdot e_j^{L_r+1}}{1 - e_j}} = \frac{1 - e_j}{1 - e_j + \alpha \cdot e_j - \alpha \cdot e_j^{L_r+1}}$$

$$d_{1-j} = Pr\{\text{HF steady state } S_0 \mid CS_k = 1-j\}$$

$$= \frac{1}{1 + \alpha \cdot e_{1-j} + \alpha \cdot e_{1-j}^2 + \ldots + \alpha \cdot e_{1-j}^{L_r}} = \frac{1 - e_{1-j}}{1 - e_{1-j} + \alpha \cdot e_{1-j} - \alpha \cdot e_{1-j}^{L_r+1}}$$

and the probability of no HF departure from the system given a certain channel state is calculated as:

$$t_j = Pr\{\text{HF steady state } S_1 \mid CS_k = j\} +$$
$$Pr\{\text{HF steady state } S_2 \mid CS_k = j\} + \ldots Pr\{\text{HF steady state } S_{L_r} \mid CS_k = j\}$$

$$= \frac{\alpha \cdot (1 - e_j) \cdot (e_j + e_j^2 + \ldots + e_j^{L_r})}{1 - e_j + \alpha \cdot e_j - \alpha \cdot e_j^{L_r+1}}$$

$$= \frac{\alpha \cdot (1 - e_j) \cdot \frac{e_j \cdot (1 - e_j^{L_r})}{1 - e_j}}{1 - e_j + \alpha \cdot e_j - \beta \cdot e_j^{L_r+1}}$$

$$= \frac{\alpha \cdot e_j \cdot (1 - e_j^{L_r})}{1 - e_j + \alpha \cdot e_j - \alpha \cdot e_j^{L_r+1}}$$

$$t_{1-j} = Pr\{\text{HF steady state } S_1 \mid CS_k = 1-j\} +$$
$$\ldots Pr\{\text{HF steady state } S_{L_r} \mid CS_k = 1-j\}$$

$$= \frac{\alpha \cdot (1 - e_{1-j}) \cdot (e_{1-j} + e_{1-j}^2 + \ldots + e_{1-j}^{L_r})}{1 - e_{1-j} + \alpha \cdot e_{1-j} - \alpha \cdot e_{1-j}^{L_r+1}} = \frac{\alpha \cdot e_{1-j} \cdot (1 - e_{1-j}^{L_r})}{1 - e_{1-j} + \alpha \cdot e_{1-j} - \alpha \cdot e_{1-j}^{L_r+1}}$$

By making the assumption that all HF transmitted are received at the receiver side, i.e. no HF lost over the channel; furthermore, it is also assumed that after enough transit time there shall be always a new HF in the queue buffer to be sent over the channel. Therefore, it is safe to set that $\alpha=1$. Now back to the finding $q_{i,j}(k+1)$ where the channel state is j and the source state is i, then:

$$q_{i,j}(k+1) = \begin{cases} q_{m,j}(k)+i, & i \in \{0,1\} \to \text{Case 1} \\ & \text{with Prob.} = c_{j,j}a_{m,i}t_j \\ q_{m,j}(k)+i-1, & i \in \{0,1\} \to \text{Case 2} \\ & \text{with Prob.} = c_{j,j}a_{m,i}d_j \\ q_{m,1-j}(k)+i, & i \in \{0,1\} \to \text{Case 3} \\ & \text{with Prob.} = c_{1-j,j}a_{m,i}t_{1-j} \\ q_{m,1-j}(k)+i-1, & i \in \{0,1\} \to \text{Case 4} \\ & \text{with Prob.} = c_{1,j,j}a_{m,i}d_{1-j} \\ q_{0,j}(0), & \to \text{Case 5} \\ & \text{with Prob.} = c_{j,j}a_{0,i} \\ q_{0,1-j}(0) & \to \text{Case 6} \\ & \text{with Prob.} = c_{1-j,j}a_{0,i} \end{cases}$$

In all cases the source state change (i.e. HF arrival) from m HFs at time slot k to i HFs at time slot k+1, where m & $i \in \{0,1\}$.

Case 1: There are $i \in \{0,1\}$ new arrivals & no departures and the channel stays in state j ($j \in \{0,1\}$).

Case 2: There are $i \in \{0,1\}$ new arrivals & one new departure and the channel stays in state j ($j \in \{0,1\}$)

Case 3: There are $i \in \{0,1\}$ new arrivals & no departures and the channel moves from state 1−j to j ($j \in \{0,1\}$)

Case 4: There are $i \in \{0,1\}$ new arrivals & one new departure and the channel moves from state 1−j to j ($j \in \{0,1\}$)

Case 5: $q_1(k)=0$ happens at the beginning of the system i.e. k=0 and the channel state remains j.

Case 6: $q_{1-j}(k)=0$ happens at the beginning of the system i.e. k=0 and the channel state is changes to 1−j.

The steady state probability of the queue length at the transmitter side $q_{i,j}[n]$ is defined as:

$$q_{i,j}[n] \triangleq \lim_{k \to \infty} Pr[q_{i,j}(k) = n]$$

therefore, $$q_{i,j}[n] = \sum_{m=0}^{min(N,n+1)} (c_{j,j}a_{m,i}d_j q_{m,j}[n-m+1] + c_{j,j}^- a_{m,i}d_j^- q_{m,j}-[n-m+1])$$

$$+ \sum_{m=0}^{min(N,n)} (c_{j,j}a_{m,i}t_j q_{m,j}[n-m] + c_{j,j}a_{m,i}t_j q_{m,j}[n-m])$$

$$+ \sum_{m=0}^{min(N,1)} (c_{j,j}a_{m,i}d_j q_{m,j}[n-m+1] + c_{j,j}a_{m,i}d_j q_{m,j}[n-m+1])$$

$$+ c_{j,j}a_{0,i}q_{0,j}[0] + c_{1-j,j}a_{0,i}q_{0,j}[0]$$

where, $\bar{j}$ denotes 1−j and $i \in 0,1$

The probability generating function (PGF) for the queue length $q_{i,j}[n]$ at the transmitter side defined as Q(z) can be expressed as equation 19:

$$Q(z) = \sum_{m=0}^{\infty} [A^{\dagger}\text{diag}[z^i] \otimes C^{\dagger}E(z)]^{m+1} \cdot [I \otimes [E(z)^{-1} - I]]Q_0$$

where, $$Q_m(z) \triangleq [Q_{m,0}(z), Q_{m,1}(z)]^T, m=0,1,\ldots N$$

$$E(z) \triangleq \text{diag}[\xi_0(z), \xi_1(z)]$$

$$\xi_j(z) \triangleq t_j + d_j z^{-1} \; j=0,1$$

$$\text{diag}[z^i] \triangleq \text{diag}[1, z, z^2, \ldots, z^N]$$

$$Q(z) \triangleq [Q_{0,0}(z), Q_{0,1}(z), Q_{1,0}(z), Q_{1,1}(z), \ldots, Q_{N,0}(z), Q_{N,1}(z)]^T$$

$$Q_0 \triangleq [q_{0,0}[0], q_{0,1}[0], 0, 0, \ldots, 0]^T$$

A: The transition probability matrix for the arrival process at the transmitter.
C: The transition probability matrix for the process that describes the state of the PLC channel.
†: is the matrix transpose
Let $$Q(z) \triangleq \sum_{i,j} Q_{i,j}(z)$$

be the PGF of the queue length. Now to determine the initial values $q_{0,0}[0]$ & $q_{0,1}[0]$. First, considering the fact that the system is stable then $Q_{i,j}(z)$ should be analytic in a closed unit disk. These boundary terms can be numerically obtained by finding all the poles of $Q_j(z)$ within this disk. By spectral decomposition of the matrix $X=A^{\dagger}\text{diag}[z^i] \otimes C^{\dagger}E(z)$ will find the poles such that:

$$X=A^{\dagger}\text{diag}[z^i] \otimes C^{\dagger}E(z)=G(z)\Gamma(z)G^{-1}(z)$$

Where, $\Gamma(z)=\text{diag}[\lambda_0(z), \lambda_1(z), \ldots, \lambda_{2N+1}(z)]$ is the eigen values of the matrix X. $g_m(z)$ and $h_m(z)$ denote the corresponding left column and right row eigen-vectors of the equation above 20; where G(z) and $G^{-1}(z)$ are defined as:

$$G(z) \triangleq [g_0(z), g_1(z), \ldots, g_{2N+1}(z)]$$

$$G^{-1}(z) \triangleq [h_0(z), h_1(z), \ldots, h_{2N+1}(z)]^{\dagger}$$

Therefore, $$X = A^{\dagger}\text{diag}[z^i] \otimes C^{\dagger}E(z) = \sum_{m=0}^{2N+1} \lambda_m(z)g_m(z)h_m(z)$$

Substituting back in eq. 19 and applying geometric series then, $$Q(z) = \sum_{i=0}^{2N+1} \frac{\lambda_i(z)}{1-\lambda_i(z)} g_i(z)h_i(z)[I \otimes E(z)^{-1} - I]Q_0(z) = \sum_{i=0}^{2N+1} \frac{\lambda_i(z)}{1-\lambda_i(z)}$$

$$\sum_{m=0}^{2N+1} g_{m,i}(z) \cdot \left( h_{m,0}(z) \frac{1-\xi_0(z)}{\xi_0(z)} \cdot q_{0,0}[0] + h_{m,1}(z) \frac{1-\xi_1(z)}{\xi_1(z)} q_{0,1}[0] \right)$$

For each root $|z_i|<1$, the following boundary equation is set:

$$\left(h_{m,0}(z)\frac{1-\xi_0(z)}{\xi_0(z)}q_{0,0}[0] + h_{m,1}(z)\frac{1-\xi_1(z)}{\xi_1(z)}q_{0,1}[0]\right) = 0$$

The using the relation that:

$$\lim_{z\to 1} Q(z) = 1$$

by solving both equations above the values for $q_{0,0}[0]$ and $q_{0,1}[0]$ can be obtained and a complete form for $Q(z)$ results.

Using Little's Law, the mean queuing delay for the ideal SR ARQ scenario $$t_q = \frac{\bar{q}}{\rho_s},$$

where ($\rho_s$) is the mean arrival rate and $\bar{q}$ is the total mean number of packets at the transmitter side (including queuing and waiting buffers) considering nonzero feedback delay which is calculated as:

$$\bar{q} = \text{mean}(q) + s\eta\rho_s$$

Following is an example modelling of the transport delay.

The transport delay consists of 2 delays: The transmission delay and the propagation delay. The transmission delay is dependent on the mean throughput ($\bar{\eta}$). Therefore, the transmission delay denoted as ($t_t$) is expressed as:

$$t_t = t_f\bar{\eta} - t_f/2$$

where $t_f$ is the overall feedback delay including transmission and propagation of the HF and of the ACK/NACK message. The propagation delay ($t_p$) is a constant delay depending the power cable physical parameters length (L) and propagation speed ($V_p$) where $t_p = \text{ceil}((L/V_p)/T_s)$.

The propagation speed ($V_p$) for power-lines is set to 173 m/μs, based on known published data. Based on the analysis of the channel model, the mean throughput ($\eta$) is defined as:

$$\eta = 1 + U[I-S]^{-1}V$$

Such that $U = [1\ 1]$ $$S = \begin{bmatrix} c_{00}e_0 & c_{10}e_0 \\ c_{01}e_1 & c_{11}e_1 \end{bmatrix}$$

and $$V = \begin{bmatrix} \pi_{c_0}e_0 \\ \pi_{c_1}e_1 \end{bmatrix}$$

where I is the identity matrix. $\pi_{c_0}$ and $\pi_{c_1}$ are the steady state probabilities that the channel is in Good and Bad states respectively; such that $$\pi_{c_0} = \frac{c_{10}}{c_{10}+c_{01}} \text{ and } \pi_{c_1} = \frac{c_{01}}{c_{10}+c_{01}}$$

Consequently, the mean transport delay is defined as $$t_{ts} = t_t + t_p$$

An example of the resequencing delay modelling follows, by determining the probability distribution of the resequencing delay without considering heavy traffic and with a limited number of retransmissions per HF. To evaluate the re-sequencing delay, the following assumptions are considered in the analysis:

1) The re-sequencing buffer at the receiver side is assumed to be an infinite buffer.

2) Hyper-frame (HF) errors occur at random on a transmission channel based on its state with the error rate $e_j$ of the channel state ($CS_k=j$).

3) ACK or NACK is sent immediately when a HF is received correctly or in error; i.e. ignoring processing delay at the receiver side.

4) There is no error for both positive and negative acknowledgments.

5) Re-transmission has high priority compared to transmission of a new HF and is performed immediately after a NACK is returned to the sender.

6) The maximum number of re-transmissions is limited to $L_r$. If a HF is re-transmitted for $L_r$ times and still received in error, then it is dropped and the HFs waiting at the receiver re-sequencing buffer are released and transferred to the RU.

7) In each slot, if there is no re-transmission, a new HF is transmitted from the ones existing at the queuing buffer.

8) A selective repeat window size is set to be W. Each slot is numbered from 0 to W−1.

9) $t_f$ is defined as the number of time slots in the total trip time, i.e. the feedback delay 10) The HF sequence number space in CPRI is equal to the size of the CPRI Frame (150 HFs), then the size of SR window could be (W<=75 HFs).

Figures 10, 11:
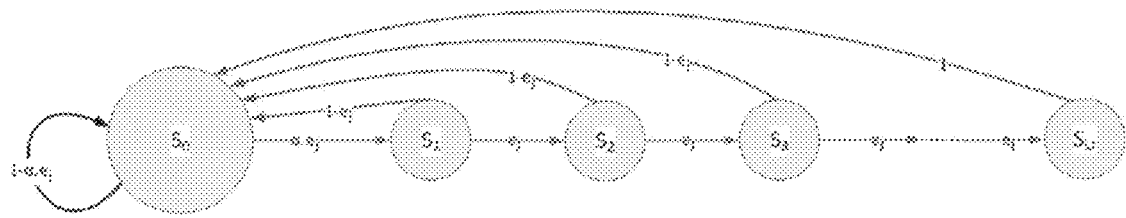
FIG. 10 is a state transition diagram based on the number of consecutive receive failures of HF.
FIG. 11 is an illustration of the selective repeat window.

In calculating the re-sequencing delay, when a hyperframe is sent on a certain slot #ω within the SR window as shown in FIG. 11, then the re-transmissions of that HF will be resent on the same slot #ω until it is delivered successfully, or it gets dropped after $L_r$ re-transmissions. Consequently, the ideal SR ARQ can be modeled as W independent slots each can be simulated as simple stop and-wait case. The probability that a HF is dropped is defined as $P_{drop} = e_j \cdot P_s(S_{Lr}|j)$, where $P_s(S_x|j)$ is the steady state probability of HF state $S_x|j$ and j is the channel state which the HF has experienced. $P_s(S_x|j)$ can be expressed as per the Markov Chain in FIG. 10 as:

$$P_s(S_0|j) = \frac{(1-e_j)}{1-e_j+\alpha e_j - \alpha e_j^{L_r+1}}, j \in \{0,1\}$$

$$P_s(S_x|j) = \frac{\alpha(1-e_j)e_j^x}{1-e_j+\alpha e_j - \alpha e_j^{L_r+1}}, x \in \{1,2,3,\ldots,L_r\} \& j \in \{0,1\}$$

$$P_{drop} = \frac{\alpha(1-e_j)e_j^{L_r+1}}{1-e_j+\alpha e_j - \alpha e_j^{L_r+1}}, j \in \{0,1\}$$

To find the re-sequencing delay ($t_{rsq}$), the probability distribution function (PDF) is defined in whi's ch $P_{rsq}(\mu, \omega|j)$={Probability that $t_{rsq}=\mu t_f+\omega|CS_k=j$} slots including the re-transmission delay of each HF received in error. In slot #0, the HF is received successfully after being received incorrectly μ times. As mentioned earlier $t_f$ is defined as the number of time slots in the round trip plus one slot for the HF in transmission. At time $t_0$, looking at slot #ω which is the slot within the SR window with the state of minimum number of receive failures, i.e. HF re-transmissions. There are two cases for which $P_{rsq}(\mu,\omega|j)$ need to be found:

A. Case ω does not =0: In this case the HF in slot #ω has the minimum number of receive failures within the SR window except for the HF in slot #0. This means that the HF in slot #ω is received correctly before any of the other HFs other than the HF in slot #0; i.e. it has been received correctly after μ+1 re-transmissions. The HF in slot #0 is received successfully after being received in error for less than or equal to μ times. The HFs in slots 1 to ω−1 as well as the HFs in slots ω+1 to W−1 have been received in error more times than the HF in slot #ω. Therefore, $P_{rsq}(\mu,\omega|j)$ can be expressed as $$P_{rsq}(\mu, \omega | j) = \left(\sum_{x=0}^{\mu} P_t(\mu | j)\right) \cdot P_R(\mu+1, \omega | j)$$

where $P_t(\mu|j)$ is the probability that the HF in slot #0 is received correctly after μ re-transmissions with channel state being j and it is defined as:

$$P_t(\mu | j) = \frac{(1-e_j) \cdot e_j^\mu}{1-e_j^{L_r+1}} \text{ so, } \sum_{x=0}^{\mu} P_t(\mu | j) = \frac{1-e_j^{\mu+1}}{1-e_j^{L_r+1}}$$

While $P_R(x,\omega|j)$ is the probability that the HF on slot #ω has been received incorrectly μ+1 times before being received successfully and can be defined as follow considering the independence among the different time slots within the SR window:

$$P_R(x, \omega | j) = P_s(S_n | j) \cdot \prod_{x=1}^{\omega-1} \sum_{y=0}^{x} P_s(S_y | j) \cdot \prod_{x=\omega+1}^{W-1} \sum_{y=0}^{x-1} P_s(S_y | j) P_R(x, \omega | j) =$$

$$P_s(S_n | j) \cdot \left[\sum_{y=0}^{x} P_s(S_y | j)\right]^{\omega-1} \cdot \left[\sum_{y=0}^{x-1} P_s(S_y | j)\right]^{W-1-\omega}$$

Therefore, $P_{rsq}(\mu, \omega|j)$ could be expressed as:

$$P_{rsq}(\mu, \omega | j) =$$

$$\left(\frac{1-e_j^{\mu+1}}{1-e_j^{L_r+1}}\right) \cdot P_s(S_\mu | j) \cdot \left[\sum_{y=0}^{\mu+1} P_s(S_y | j)\right]^{\omega-1} \cdot \left[\sum_{y=0}^{\mu} P_s(S_y | j)\right]^{W-1-\omega}$$

B. Case ω=0: In this case at time $t_0$ the HF in slot #0 has been received after μ re-transmissions while all other slots within the SR Window have been received in error for more than p times or have been dropped. In such situation $P_{rsq}(\mu,0|j)=\Pr\{t_{rsq}=\mu t_f|j\}$ can be expressed as:

$$P_{rsq}(\mu, 0 | j) = P_t(\mu | j) \cdot \left[\sum_{y=0}^{\mu} P_s(S_y | j)\right]^{W-1}$$

The IND-Re defect on the end to end delay is now discussed with the following example modelling.

The impulse noise detection and re-transmission (IND) embodiment is an impulse noise detection mechanism that depends on the use of peak to average power ratio measurements to find an impulse. It also enables the mitigation of the impulsive noise effects through the use of light-weight re-transmission upon the detection of an impulse. This technique can simply be applied through the use of a new hardware module in the CPG in case of CPRI based front-haul as previously described. If the front-haul is eCPRI based or use any other Ethernet based technology e.g. XRAN, IND is then a simple software controller module in the CPG. IND will manage the HARQ transmit buffer and ensures reliable data transfer between the CPG pair based on selective-repeat (SR) ARQ. Different from using just the conventional HARQ, IND can use the collision detection mechanism in the Ethernet module to detect an impulsive noise event, according to an alternate embodiment.

To counter measure the malicious effect of the impulsive noises, one technique is to follow a cross-layer design approach by allowing the energy level of the PLC link to be real-time monitored and reported to the IND module. The Ethernet module as encapsulates each HF in an Ethernet frame and also provides the channel status regarding whether an impulsive noise is in place through energy monitoring capabilities in the collision sensing functionality of the Ethernet module. By jointly considering the carrier energy level, the IND calculates the peak to average power ratio(PAPR) in every HF duration and concludes whether an impulsive noise event has occurred.

When the PAPR is greater than a certain threshold, such as by example only 10 dB, it indicates the occurrence of an impulsive noise event, where the SR-ARQ protocol can respond as follows in a particular configuration:

1. It holds or stops the on-going HF transmission, while the receiver drops the HF that is being received.

2. As soon as the channel is found clear again, the SR-ARQ simply considers all the currently unacknowledged HFs in the wait buffer at the transmitter side as lost and flushes all these HFs to the receiver. More specifically, a retransmission of all non-acknowledged hyper-frames are sent as the system does not wait for feedback from the receiver as it is assumed that all hyper-frames or acknowledgement in transmission during the detected impulsive noise event are corrupt.

To consider the delay introduced into the system due to the use of IND, the module is modelled as a single state MC model with a probability that an impulse is detected as $P_{imp}$ which is:

$$P_{imp} = Pr[A_{imp} > \sqrt{Th \times P_{mean}}] \times Pr[t_{iat} \geq \Delta t]$$

where $A_{imp}$ is the amplitude of the impulsive noise with Middleton's Class A distribution. $t_{iat}$ is the inter-arrival time between the impulses with an exponential nature with mean $\mu_{iat}=10.1$ ms. Therefore, $P_{imp}$ can be expressed as:

$$P_{imp} = \left(1 - \int_0^{A_{imp}} \sum_0^\infty \frac{e^{-x^2/2\sigma_k^2}}{\sqrt{2\pi\sigma_k^2}} dx\right) \times \left(1 - e^{-\Delta t/\mu_{iat}}\right)$$

$$\text{with } \sigma_k^2 = \sigma^2\left(\frac{(k/A)+\Gamma}{1+\Gamma}\right)$$

The leakage probability of an impulse over more than one time slot can be calculated based on the probability that the width of an impulse exceeds the width of a time slot (Ts). The width of the impulses ($t_w$) is represented by the two terms Gaussian model in papers L. Di Bert, P. Caldera, D. Schwingshackl and A. M. Tonello, "On noise modeling for power line communications," in 2011 *IEEE International Symposium on Power Line Communications and Its Applications*, 2011, pp. 283-288.

and

T. Esmailian, F. Kschischang, and P. Glenn Gulak, "In-Building Power Lines as high-speed communication channels: channel characterization and a test channel ensemble." Int. J. Commun. Syst. 16, pp. 381-400, 2003.

with mean 4.7 µs as:

$$P_{t_w}(v) = P_1 N(m_1, \sigma_1^2) + P_2 N(m_2, \sigma_2^2)[\mu s]$$

where $P_1=0.736$, $m_1=4.9$, $\sigma_1=0.2$ and $P_2=0.318$, $m_2=4.2$, $\sigma_2=0.25$ The hyper-frame time slot duration for CPRI is set to be 66.67 µs. By calculating $Pr\{t_w > 66.67 \mu s\}$, it can be determined that the leakage probability is negligible since the cumulative density function (CDF) of $t_w$ reaches 99.9999% at $t_w < 5.5$ µs.

Consequently, whenever an impulse is detected the delay introduced is approximated up to one Ts plus the transmission of all the HFs being transported during the impulse being flushed through the system. Therefore, the introduced delay due to IND $t_{IND}$ can be expressed as:

$$t_{IND} = P_{imp} \times (W+1)[Ts]$$

where W is the number of time slots within the selective repeat window (assuming all the HFs in the window were not acknowledged). One slot is added to the delay due to the wait time for the impulse width which as indicated above is less than one time slot.

Once all of the component delays of the end to end delay have been determined, then the staging buffer size can be set to a minimum number of hyper-frames or timeslots that are needed to be buffered.

To summarize, the previously described embodiments and methodology has investigated demonstrated the use of residential low-voltage power lines as the last hop of the C-RAN front-haul that transports TDM based CPRI hyper-frames. To meet the CPRI requirements on data rate and BER defined under 5G NR, a CPG according to the above embodiments has been developed, which serves as an agent for creating a virtual CPRI link between the DU and RU. Simulations have proven that the CPG operating the proposed IND-Re technique with spatial multiplexing and HARQ can effectively create a CPRI link over the noisy PLC channel without modification of any existing protocol operation and hardware arrangement.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art. The scope of the claims should not be limited by the particular embodiments set forth herein, but should be construed in a manner consistent with the specification as a whole.

The invention claimed is:

1. A method for communicating common protocol radio interface (CPRI) frames using power lines comprising:

transmitting the frames from a transmitter external to a building onto the power lines for receipt by a receiver in the building;

compensating for noise present in the power lines, including by sensing a peak to average power ratio (PAPR) of the power lines to be greater than a predetermined threshold, and executing the following when the sensed PAPR is greater than the predetermined threshold, controlling the transmitter to hold a current frame from being transmitted, and controlling the receiver to discard an incoming frame; and initiating retransmission of the incoming frame and enabling receiving of the receiver when the PAPR is sensed to be less than the predetermined threshold.

2. The method of claim 1, wherein compensating for noise includes compensating for background noise present in the power lines based on a known noise model using worst-case scenario parameters.

3. The method of claim 1, wherein prior to transmitting the frames, the frames are received and buffered, and a copy of the incoming frame transmitted to the receiver is stored.

4. The method of claim 3, including sending an acknowledgement by the receiver when the sensed PAPR is less than or equal to the predetermined threshold and the incoming frame is received, and removing the stored copy of the incoming frame in response to the acknowledgement.

5. The method of claim 4, including sending a non-acknowledgement by the receiver and dropping the incoming frame when the sensed PAPR is greater than the predetermined threshold, stopping transmission of the current frame by the transmitter in response to the non-acknowledgement, and initiating retransmission includes transmitting the stored copy of the incoming frame before the current frame is transmitted from the transmitter, after the non-acknowledgement signal is received and after the sensed PAPR is less than or equal to the predetermined threshold.

6. The method of claim 5, wherein each frame received by the receiver has a unique ID number, and includes
resequencing all received frames which are transmitted and retransmitted by the transmitter, and holding all the received frames in a buffer until all lower number ID frames are received, and
streaming out all the held and resequenced frames when the buffer is full.

7. The method of claim 6, including buffering the resequenced frames with a buffer sized to continuously stream out the buffered resequenced frames without jitter.

8. A system for communicating common protocol radio interface (CPRI) frames using power lines comprising:
a central unit configured to transmit data over a dedicated telecommunications line;
a distributed unit outside of a building configured to demultiplex a CPRI stream received from the dedicated telecommunications line;
a first gateway device configured to receive the CPRI stream from the distributed unit and to apply the CPRI stream onto a three-phase power line providing power to the building;
a second gateway device configured to receive one of the single phase lines containing a phase/live wire, a neutral wire and a protective earthing wire, the first gateway device and the second gateway device being further configured to
compensate for noise present in the power line, including by sensing a peak to average power ratio (PAPR) of the power line to be greater than a predetermined threshold, and executing the following when the sensed PAPR is greater than the predetermined threshold,
controlling the first gateway device to hold a current frame from being transmitted, and
controlling the second gateway device to discard an incoming frame; and,
initiating retransmission of the incoming frame by the first gateway device and enabling receiving by the second gateway device when the PAPR is sensed to be less than the predetermined threshold; and,
a receiving unit inside of the building coupled to the second gateway device configured to receive the CPRI stream.

9. The system of claim 8, wherein the first gateway device is further configured to execute signal conditioning and error correction to compensate for powerline communication noise of the three-phase power line.

10. The system of claim 8, wherein the three-phase power line includes a first live wire (P1), a second live wire (P2) and a third live wire (P3), and the second gateway de-vice receives the single phase line containing the first live wire (P1), the neutral wire and the protective earthing wire.

11. The system of claim 10, wherein the receiving unit includes an antenna.

12. The system of claim 10, further including a third gateway device configured the same as the second gateway device, and receiving a single phase line containing the second live wire (P2), the neutral wire and the protective earthing wire.

13. The system of claim 12, further including a fourth gateway device configured the same as the second gateway device, and receiving a single phase line containing the third live wire (P3), the neutral wire and the protective earthing wire.

14. The system of claim 8, wherein the first gateway device includes
a source buffer configured to buffer frames of the CPRI stream received from the distributed unit, and to transmit the incoming frame to the second gateway device, and
a waiting buffer configured to receive a copy of the incoming frame.

15. The system of claim 14, wherein the second gateway device is configured to send an acknowledgement signal to the first gate-way device when the sensed PAPR is less than or equal to the predetermined threshold and when the incoming frame is received by the second gateway device, and the waiting buffer removes the copy of the incoming frame in response to the received acknowledgement signal.

16. The system of claim 15, wherein the second gateway device is configured to
send a non-acknowledgement signal to the first gateway device and to drop the incoming frame that was received when the sensed PAPR is greater than the predetermined threshold,
the first gateway device stops trans-mitting the current frame in response to the non-acknowledgement signal and
the waiting buffer transmits the copy of the incoming frame before the current frame is transmitted by the source buffer after the non-acknowledgement signal is received and after the sensed PAPR is less than or equal to the predetermined threshold.

17. The system of claim 16, wherein each frame has a unique ID number, and the second gateway device includes a re-sequencing buffer configured to hold higher number ID frames until all lower number ID frames are received, the re-sequencing buffer streaming the held and resequenced frames when the re-sequencing buffer is filled.

18. The system of claim 17, wherein the second gateway device includes a staging buffer configured to receive the held frames from the re-sequencing buffer and sized to continuously stream out frames to the receiving unit without jitter.

* * * * *